(12) United States Patent
Ueda et al.

(10) Patent No.: US 6,418,108 B1
(45) Date of Patent: Jul. 9, 2002

(54) OPTICAL HEAD, RECORDING AND/OR REPRODUCING METHOD AND APPARATUS AND METHOD FOR DETECTING THICKNESS

(75) Inventors: Mitsunori Ueda, Chiba; Takeshi Kubo; Junichi Suzuki, both of Kanagawa; Satoshi Sakamoto; Hiroshi Kawamura, both of Tokyo; Satoshi Hineno, Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/226,131

(22) Filed: Jan. 7, 1999

(30) Foreign Application Priority Data

Jan. 9, 1998 (JP) .......................................... 10-003480
Jun. 8, 1998 (JP) .......................................... 10-159654

(51) Int. Cl.[7] ................................................ G11B 7/00
(52) U.S. Cl. ................................ 369/112.23; 369/53.23
(58) Field of Search ........................... 369/53.2, 53.22, 369/53.23, 112.23, 112.01, 119, 116, 44.23, 44.26

(56) References Cited

U.S. PATENT DOCUMENTS 5,966,362 A * 10/1999 Arai et al. ............. 369/112.23

* cited by examiner

Primary Examiner—Paul W. Huber
(74) Attorney, Agent, or Firm—Rader, Fishman & Grauer PLLC; Ronald P. Kananen, Esq.

(57) ABSTRACT

An optical head used for recording/reproducing information signals for an optical disc having a light transmitting layer on a recording layer includes an actuator for the collimator lens. A collimator lens arranged between a light source and an objective lens is moved by the actuator for the collimator lens in a direction of cancelling the spherical aberration ascribable to thickness errors in the light transmitting layer. By this structure, the amount of generation of spherical aberration is reduced even if the numerical aperture NA of the objective lens loaded on the optical head is increased to render it possible to increase the recording capacity of the optical disc.

18 Claims, 13 Drawing Sheets

OPTICAL HEAD, RECORDING AND/OR REPRODUCING METHOD AND APPARATUS AND METHOD FOR DETECTING THICKNESS

BACKGROUND OF THE INVENTION

1. Field of the Invention

This invention relates to an optical head used for recording and/or reproducing an information recording medium, such as an optical disc, and a recording and/or reproducing apparatus provided with such optical head. This invention also relates to a recording and/or reproducing method for an information recording medium, such as an optical head, and to a method for detecting the thickness of a light transmitting layer of an information recording medium having a light transmitting layer formed on the recording medium.

2. Description of the Related Art

An information recording medium, such as read-only optical disc, a phase-change type optical disc, a magneto-optical disc or an optical card, is extensively used for storage of data, such as the video or audio information or computer program data. Recently, the demand for a high recording density and large recording capacity for these information recording mediums is becoming more and more imminent.

For raising the recording density of the information recording medium, it is effective to increase the numerical aperture NA of an objective lens loaded on an optical head and to shorten the wavelength of the light used to reduce the size of the laser light spot formed by the objective lens.

Thus, with a compact disc (CD) developed earlier as a digital optical disc, the numerical aperture NA of an objective lens is 0.45 and the wavelength of the light used is 780 nm. On the other hand, with a DVD, a digital optical disc higher in recording density and recording capacity than the compact disc, the numerical aperture NA of the objective lens is 0.6 and the wavelength of the light used is 650 nm.

Meanwhile, the information recording medium, such as an optical disc, has a light transmitting layer on a recording layer having the information signals recorded thereon. This recording layer is illuminated with a recording layer carrying the information signals through the light transmitting layer for recording or reproduction. If there is any error in the thickness of the light transmitting layer which deviates from a prescribed value, spherical aberration is produced due to this error. Of this spherical aberration, a degree-three spherical aberration, for example, is represented by the equation (1):

$$W_{40} = \{\Delta t(n^2-1)/(8n^3)\}NA^4 \qquad (1)$$

where $\Delta t$ is a thickness error of the light transmitting layer, n is the refractive index of the light transmitting layer and NA is the numerical aperture of an objective lens.

As may be seen from the equation (1), the spherical aberration attributable to the thickness error of the light transmitting layer is increased in proportion to a fourth power of the numerical aperture NA. Thus, if the numerical aperture in particular is increased, it is crucial to suppress the occurrence of the spherical aberration.

As may also be seen from the equation (1), it is effective to narrow the tolerance of the thickness of the light transmitting layer to reduce its thickness error for suppressing the address signal spherical aberration. For example, the thickness tolerance of the light transmitting layer in the DVD is ±0.03 mm. If the spherical aberration attributable to the thickness error of the light transmitting layer is to be suppressed to a value of the same order of magnitude as that of the DVD with the numerical aperture NA of 0.6, it suffices if the thickness error $\Delta t$ of the light transmitting layer is within a range of the equation (2):

$$-0.00388/NA^4 \leq \Delta t \leq +0.00388/NA^4 \qquad (2).$$

From the above equation (2), it is possible to find the tolerance value required for suppressing the spherical aberration to substantially the same order of magnitude as that for the DVD in case of enlarging the numerical aperture NA. That is, it may be seen from the above equation (2) that, for the numerical aperture NA=0.7 or NA=0.85, it is sufficient if $-0.016$ mm $\leq \Delta t \leq +0.016$ mm or $-0.0074$ mm $\leq \Delta t \leq +0.0074$ mm, respectively.

However, it is extremely difficult to narrow the thickness tolerance of the light transmitting layer. Although it is not a significant process change for the mass-producing system, it is extremely difficult to raise the precision of the thickness error of the light transmitting layer because such error depends on the particular manufacturing method of the information recording medium. If the precision of the thickness error of the light transmitting layer could be achieved, significant precess changes and so forth are required, thus significantly increasing the manufacturing cost. It is therefore not advisable to narrow the thickness tolerance of the light transmitting layer to suppress the spherical aberration.

SUMMARY OF THE INVENTION

It is therefore an object of the present invention to provide an optical head and a recording and/or reproducing method and apparatus in which the spherical aberration can be suppressed even if the numerical aperture NA is increased.

It is another object of the present invention to provide a recording and/or reproducing method in which the spherical aberration can be suppressed even if the numerical aperture NA is increased.

It is yet another object of the present invention to provide a thickness detection method in which the thickness of a light transmitting layer formed on a recording layer of an information recording medium can be detected easily.

In one aspect, the present invention provides an optical head for an information recording medium having a light transmitting layer on a recording layer adapted for recording information signals, including a light source for radiating the light, an objective lens for converging the light from the light source via the light transmitting layer on the recording layer, an optical element of a pre-set refractive power arranged between the light source and the objective lens, and movement means for causing movement of the optical element responsive to the thickness of the light transmitting layer.

In the above optical head, the optical element is preferably a collimator lens. If the light transmitting layer is of a prescribed value, the collimator lens substantially collimates the light radiated from the light source to fall on the objective lens.

If, in the optical head, the numerical aperture NA of the objective lens is not less than 0.65, the light transmitting layer of the information recording medium preferably has a film thickness not less than 0.47 mm.

Preferably, the movement means includes a reference shaft arranged substantially parallel to the optical axis of the light radiated from the light source to on the optical element, optical element supporting means for supporting the optical element and adapted for being translated along the reference shaft, a motor, and a gearing for converting the motor rotation into a translating movement parallel to the optical axis and for transmitting the translating movement to the optical element supporting means. The motor rotation is converted by the gearing into the translating movement parallel to the optical axis to cause movement of the optical element supporting means to cause movement of the optical element so as to cancel the spherical aberration responsive to the thickness of the light transmitting layer.

With the present optical head, the optical element of a pre-set refractive power, arranged between the light source and the objective lens, is moved by movement means to cancel the spherical aberration depending on the thickness of the light transmitting layer. Thus, the spherical aberration ascribable to the error in thickness can be suppressed despite thickness error in the light transmitting layer.

In another aspect, the present invention provides a recording and/or reproducing apparatus for recording and/or reproducing information signals for a recording layer of an information recording medium also having a light transmitting layer on the recording medium, including thickness detection means for detecting the thickness of the light transmitting layer, and an optical head for an information recording medium having a light transmitting layer on a recording layer adapted for recording information signals. The optical head includes a light source for radiating the light, an objective lens for converging the light from the light source via the light transmitting layer on the recording layer, an optical element of a pre-set refractive power arranged between the light source and the objective lens, and movement means for causing movement of the optical element responsive to the thickness of the light transmitting layer as detected by the thickness detection means.

In the above optical head, the optical element is preferably a collimator lens. If the light transmitting layer is of a prescribed value, the collimator lens substantially collimates the light radiated from the light source to fall on the objective lens.

If, in the optical head, the numerical aperture NA of the objective lens is not less than 0.65, the light transmitting layer of the information recording medium preferably has a film thickness not less than 0.47 mm.

In the above recording and/or reproducing apparatus, the movement means includes a reference shaft arranged substantially parallel to the optical axis of the light radiated from the light source to fall on the optical element, optical element supporting means for supporting the optical element and adapted for being translated along the reference shaft, a motor and a gearing for converting the motor rotation into a translating movement parallel to the optical axis and for transmitting the translating movement to the optical element supporting means. The motor rotation is converted by the gearing into the translating movement parallel to the optical axis to cause movement of the optical element supporting means to cause movement of the optical element so as to cancel the spherical aberration responsive to the thickness of the light transmitting layer.

With the present recording and/or reproducing apparatus, the optical element of a pre-set refractive power, arranged between the light source and the objective lens, is moved by movement means to cancel the spherical aberration depending on the thickness of the light transmitting layer. Thus, the spherical aberration ascribable to the error in thickness can be suppressed despite thickness error in the light transmitting layer.

In a still another aspect, the present invention provides a recording and/or reproducing method for recording and/or reproducing information signals for a recording layer of an information recording medium also having a light transmitting layer, including using an optical head having a light source for radiating the light, an objective lens for converging the light from the light source via the light transmitting layer on the recording layer, and an optical element of a pre-set refractive power arranged between the light source and the objective lens, and detecting the thickness of the light transmitting layer to cause movement of the optical element responsive to the results of detection so as to cancel the spherical aberration.

In the above optical head, the optical element is preferably a collimator lens. If the light transmitting layer is of a prescribed value, the collimator lens substantially collimates the light radiated from the light source to fall on the objective lens.

If, in the optical head, the numerical aperture NA of the objective lens is not less than 0.65, the light transmitting layer of the information recording medium preferably has a film thickness not less than 0.47 mm.

With the present recording and/or reproducing apparatus, the optical element of a pre-set refractive power, arranged between the light source and the objective lens, is moved by movement means to cancel the spherical aberration depending on the thickness of the light transmitting layer. Thus, the spherical aberration ascribable to the error in thickness can be suppressed despite thickness error in the light transmitting layer.

In yet another aspect, the present invention provides a method for detecting the thickness of a light transmitting layer provided on a recording layer of an information recording medium, the recording layer being adapted for recording information signals thereon, including radiating light from a light source, converging the light radiated by the light source by an objective lens on the information recording medium, receiving the return light converged by the objective lens on the information recording medium and reflected from the information recording medium by a photodetector to detect focussing error signals, and detecting the thickness of the light transmitting layer from signal portions of the focussing error signals due to the return light reflected by the photodetector and those due to the return light reflected by the surface of the light transmitting layer.

In the thickness detection method of the present invention, in which the thickness of the light transmitting layer is detected from the focussing error signals, the thickness of the light transmitting layer can be detected without requiring dedicated detection means.

According to the present invention, the spherical aberration ascribable to the thickness error of the light transmitting layer can be suppressed even if the numerical aperture NA of the objective lens increased. Therefore, the information recording medium can be improved in recording density and in recording capacity without raising the production cost of the information recording medium while the tolerance of the thickness error of the light transmitting layer is maintained at a larger value.

DESCRIPTION OF THE PREFERRED EMBODIMENTS

Figure 1:
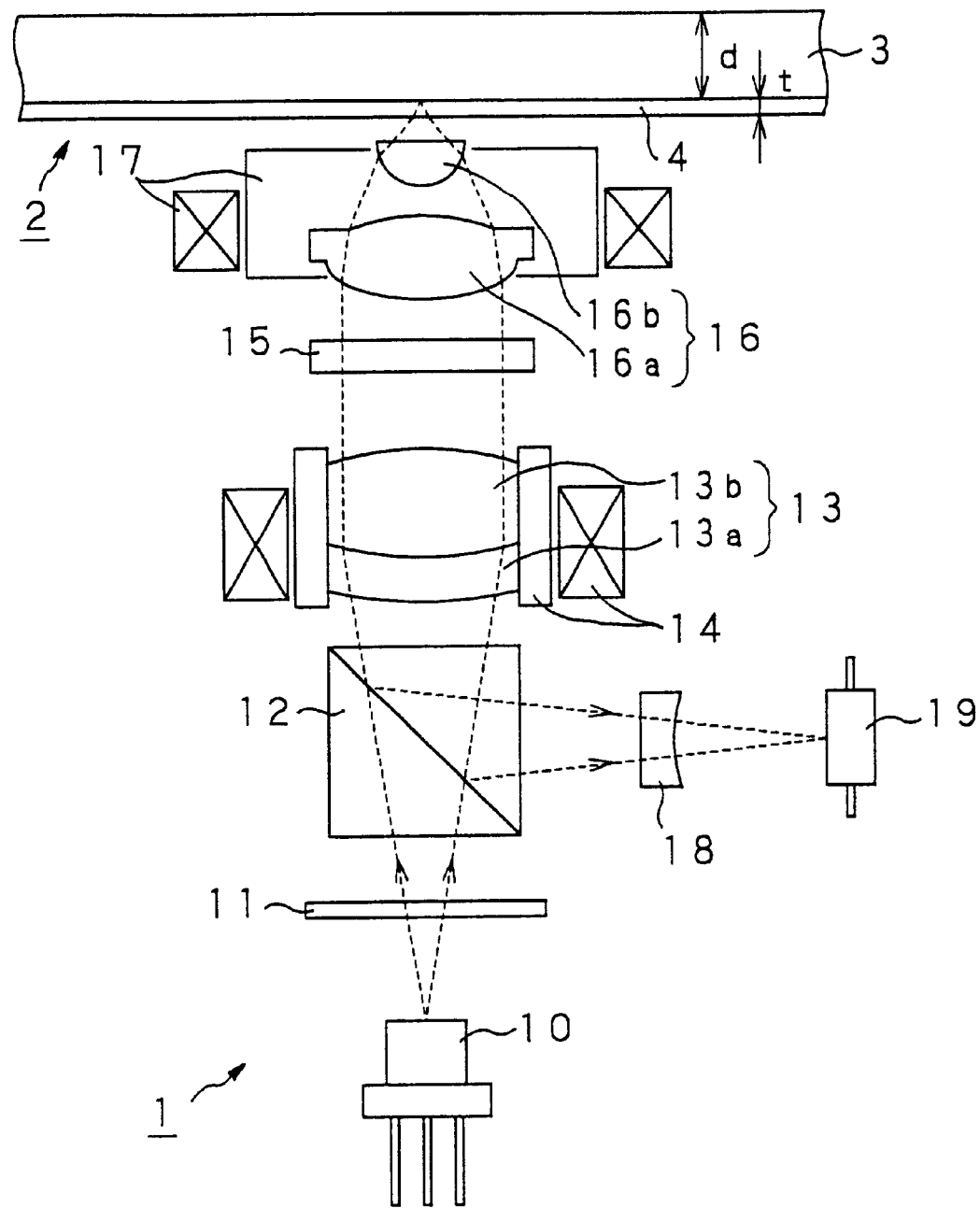
FIG. 1 shows an example of an optical head embodying the present invention.

Referring to the drawings, preferred embodiments of the present invention will be explained in detail.

FIG. 1 shows an example of an optical head 1 embodying the present invention. This optical head 1 is an optical head used for recording/reproducing a phase-change optical disc 2. Although the optical head 1 used for recording/reproducing the phase-change optical disc 2 is here taken as an example, the present invention is widely applicable to an optical head for an information recording medium having a light transmitting layer on a recording layer adapted for recording the information signals thereon. The information recording medium to be recorded and/or reproduced may be a read-only disc, a magneto-optical disc or an optical card.

The optical disc 2, recorded/reproduced by the optical head 1, has a recording layer for recording information signals by phase change, on a substrate 3 of a thickness d of, for example, approximately 1.2 mm or approximately 0.6 mm, while having a light transmitting layer 4 of a thickness t of, for example, approximately 0.1 mm, on the recording layer. The light transmitting layer 4 serves as a protective layer for protecting the recording layer. The optical disc 2 is designed for recording/reproducing information signals by radiating the light from the side of the light transmitting layer 4, much thinner in film thickness than the substrate 3, instead of from the side of the substrate 3.

By causing the light to fall from the side with a smaller thickness up to the recording layer, it is possible to suppress the aberration to realize a recording density and a recording capacity higher than those of the conventional CD or DVD. The present invention can, however, be applied to the case of using an information recording medium adapted for recording and/or reproducing information signals with the light incident from the substrate side.

Referring to FIG. 1, the optical head 1 includes a light source 10, a diffraction lattice 11, a polarizing beam splitter 12, a collimator lens 13, an actuator for the collimator lens 14, a quarter wave plate 15, an objective lens 16, a biaxial actuator for the objective lens 17, a multiple lens 18 and a photodetector 19.

The light source 10 radiates light towards the optical disc 2 at the time of recording/reproduction, and is comprised of a semiconductor laser adapted for radiating the linear polarized laser light with a wavelength $\lambda$ of 650 nm. For reproducing the information signals from the optical disc 2, the light source 10 radiates a laser light beam of a constant output. For recording the information signals on the optical disc 2, the light source 10 modulates the intensity of the outgoing laser light in dependence upon the signals for recording.

In the present invention, there is no limitation to the wavelength $\lambda$ of the laser light radiated from the light source 10. If the semiconductor laser radiating the laser light of a wavelength shorter than 650 nm, for example, it is advisable to use the laser light of the shorter wavelength in order to realize a higher recording density and a higher recording capacity.

The laser light radiated from the light source 10 first is incident on and diffracted by the diffraction lattice 1. This diffraction lattice 11 is used for splitting the laser light into at least three portions to enable so-called three-spot tracking servo.

The 0th order light and the first order light diffracted by the diffraction lattice 11(collectively termed the incident laser light) is transmitted through the polarizing beam splitter 12 to fall on the collimator lens 13, which is constituted by bonding two spherical lenses 13a, 13b together.

If the thickness t of the light transmitting layer 4 of the optical disc 2 is of a prescribed value, the incident light on the collimator lens 13 is collimated by the collimator lens 13. Stated differently, the collimator lens 13 is an optical device having a pre-set refractive power and, if the thickness t of the light transmitting layer 4 of the optical disc 2 is of a pre-set value, the collimator lens 13 is arranged to collimate the incident laser light.

Meanwhile, the collimator lens 13 is loaded on the actuator for the collimator lens 14 and is thereby moved in the fore-and-aft direction along the optical axis of the incident laser light. If the thickness t of the light transmitting layer 4 of the optical disc 2 is off the prescribed value, the collimator lens 13 is moved by the actuator for the collimator lens 14 to correct the spherical aberration ascribable to the error in thickness of the light transmitting layer 4. That is, if the thickness t of the light transmitting layer 4 of the optical disc 2 is off the prescribed value, the incident laser light is turned by the collimator lens 13 into the diverging light or the converging light to correct the spherical aberration ascribable to the thickness error of the light transmitting layer 4.

The incident laser light, radiated from the collimator lens 13, falls on the objective lens via the quarter wave plate 15. When transmitted through the quarter wave plate 15, the incident laser light is turned into a circular polarized light beam which then falls on the objective lens 16.

The objective lens 16 is used for collecting the light on the recording layer of the optical disc 2. The incident laser light, turned into the circular polarized light beam, is converged by the objective lens 16 to fall on the recording layer of the optical disc 2 via the light transmitting layer 4 of the optical disc 2.

Although the objective lens 16 may be of a sole lens, it may also be constituted by bonding two lenses 16a, 16b together, as shown in FIG. 1. If the objective lens 16 is constructed from two lenses 16a, 16b, the lens can be fabricated easily, even if the numerical aperture NA is enlarged, without it being necessary to use an excessive strict tolerance for the curvature of the respective lens surfaces. That is, by constructing the objective lens 16 from the two lenses 16a, 16b, it is easily possible to enlarge the numerical aperture NA to realize higher recording density and higher recording capacity.

The objective lens 16 may be constructed from three or more lenses. By constructing the objective lens 16 from three or more lenses, it is possible to moderate the curvature of the respective lens surfaces. However, if the number of the lenses is excessive, it becomes difficult to combine the lenses to high accuracy. Therefore, it is desirable to construct the objective lens from two lenses.

The incident laser light, collected by the objective lens 16 to fall on the recording layer of the optical disc 2, is reflected by the recording layer as a return light beam. This return light beam is transmitted through the objective lens 16 to fall on the quarter wave plate 15. This return light is first transmitted through the objective lens 16 by tracing the original optical path and is transmitted through the quarter wave plate 15 so as to be turned into a linear polarized light beam 90° rotated with respect to the polarizing direction of the ongoing light. The return light is then collimated by the collimator lens 13 to be incident on and reflected on the polarizing beam splitter 12.

The return light reflected by the polarizing beam splitter 12 is incident on and detected by the photodetector 19 via the multiple type lens 18. The multiple type lens 18 has a cylindrical light incident surface and a concave light outgoing surface. The multiple type lens 18 operates for according the astigmatic aberration to the return light to enable focussing servo by the so-called astigmatic aberration method.

The photodetector 19, adapted for detecting the return light, to which the astigmatic aberration has been accorded by the multiple type lens 18, includes six photodiodes, as an example. The photodetector 19 outputs electrical signals proportionate to the light intensity of the return light falling on the respective photodiodes and executes pre-set calculations on the electrical signals to generate and output servo signals such as focussing servo signals or tracking servo signals.

Specifically, the photodetector 19 detects the return light, to which the astigmatic aberration has been accorded by the multiple lens 18, to generate and output focussing servo signals by the so-called astigmatic aberration method. Based on these focussing servo signals, the optical head 1 drives the biaxial actuator for the objective lens 17, carrying the objective lens 16, in order to perform focussing servo.

The photodetector 19 also detects the return light beams of the zeroth order light and the ± first order light, diffracted by the diffraction lattice 11, to generate tracking servo signals by the so-called three-beam method to output the resulting tracking servo signals. Based on these tracking servo signals, the optical head 1 drives the biaxial actuator for the objective lens 17, carrying the objective lens 16, in order to perform tracking servo.

When reproducing information signals from the optical disc 2, the photodetector 19 also processes electrical signals corresponding to the light intensity of the return light incident on the respective photodiodes with preset calculations to generate and output playback signals from the optical disc 2.

In the present optical disc 1, the objective lens 16 is loaded on the biaxial actuator for the objective lens 17 to effect tracking servo and focussing servo. Alternatively, only focussing servo may be applied as the servo performed by moving the objective lens by an actuator, while the tracking servo may be applied by moving the entire optical head.

When the light is collected on the recording layer of the optical disc 2, using the optical head 1, the aberration ascribable to errors in thickness of the light transmitting layer 4 of the optical disc 2 is produced mainly by defocussing or due to spherical aberration.

The defocussing is corrected by focussing servo. That is, the objective lens 16 is moved along its optical axis in the fore-and-aft direction by the biaxial actuator for the objective lens 17 to correct the defocussing to effect focussing on the recording layer. This correction for defocussing is performed on conventional optical heads.

On the other hand, the spherical aberration cannot be corrected by moving the objective lens in the fore-and-aft direction along the optical axis. The spherical aberration can be corrected by exchanging the objective lens 16 or by changing the refractive index of the optical medium of the objective lens 16 depending on the thickness t of the light transmitting layer 4. However, these techniques cannot be said to be realistic.

Thus, with the optical head 1 embodying the present invention, the collimator lens 13 is moved in the fore-and-aft direction along the optical axis by the actuator for the collimator lens 14 to correct the spherical aberration ascribable to the thickness error of the light transmitting layer 4. That is, with the present optical head 1, the actuator for the collimator lens 14 serves as movement means for moving the collimator lens 13 for cancelling the spherical aberration depending on the thickness t of the light transmitting layer 4 of the optical disc 2.

The spherical aberration produced due to error in thickness of the light transmitting layer 4 and the method for correcting the aberration are explained in detail.

If the light transmitting layer 4 has a thickness error, there is produced the degree-three spherical aberration $W_{40}$ given by the equation (1):

$$W_{40} = \{\Delta t(n^2-1)/(8n^3)\}NA^4 \qquad (1)$$

as discussed above, where $\Delta t$ is a thickness error of the light transmitting layer, n is the refractive index of the light transmitting layer and NA is the numerical aperture of an objective lens.

This equation (1) is obtained from a Taylor expansion of the total aberration quantity with the numerical aperture NA of the objective lens and converted to a wavefront aberration. That is, if the numerical aperture NA is represented by the sine function and expanded, the following equation (3):

$$\sin(\theta) = x - x^3/6 + x^5/120 - x^7/5040 + \rho(x)^8 \qquad (3)$$

is obtained, in which the wave front aberration as found from the second term of the right side of the equation (3) is the degree-three spherical aberration represented by the above equation (1).

However, as may be seen from the equation (3), there are actually higher degree aberrations. The wavefront aberration, as found from the third term of the right side of the equation (3) is a quantity termed the degree five spherical aberration $W_{50}$ represented by the following equation (4):

$$W_{50} = \{\Delta t(n^2-1)(n^2+3)/48n^5\} NA^6 \quad (4).$$

The sum of the degree-three spherical aberration $W_{50}$ and the degree-five spherical aberration $W_{60}$, produced due to the thickness error of the light transmitting layer 4, is the sum of the equations (1) and (4) and is given by the equation (5):

$$W \approx \{W_{40}[1+\{(n^2+3)/6n^2\}NA^2] \quad (5).$$

The total aberration is found by differentiating the equation (5) by the numerical aperture NA and given by the following equation (6):

$$\delta S = \{\Delta t(n^2-1)/2n^3\} NA^3 [1+\{(n^2+3)/4n^2\}NA^2] \quad (6).$$

The degree-three spherical aberration $W_{40}$, given by the above equation (1), can be represented by the sum of the aberrations produced on the respective optical planes. Thus, if these is present only the degree-three spherical aberration $W_{40}$, it can be corrected by arranging an optical element producing spherical aberration of the opposite sign somewhere between the light source 10 and the light transmitting layer 4. However, as may be seen from the above equation (5), the smaller the refractive index n of the light transmitting layer 4, and the larger the numerical aperture NA of the objective lens 16, the larger is the contribution of the degree-fifth spherical aberrations $W_{60}$ in the spherical aberration generated by the thickness error $\Delta t$ of the light transmitting layer 4, such that correction solely of the degree-three spherical aberration W40 is not sufficient.

It is noted that the degree-three spherical aberration $W_{40}$ is maximum for the refractive index n of the light transmitting layer 4 of $3^{1/2}$ ($\approx$1.732) and is decreased abruptly when the refractive index n of the light reflecting layer 4 is smaller than the above value. The refractive index n of the light transmitting layer 4 usually is of the order of 1.5. Thus, if the contribution of the degree-five spherical aberration $W_{60}$ is increased by the refractive index n of the light transmitting layer 4 becoming smaller, this degree-five spherical aberration $W_{60}$ is masked by the overall decrease of the total aberration to raise no serious problem.

On the other hand, if the numerical aperture NA of the objective lens 16 is increased as described above, the contribution of the degree-five spherical aberration $W_{60}$ is increased. This increase in the degree-five spherical aberration $W_{60}$ cannot be disregarded. If, for example, the numerical aperture NA is increased such that the proportion of the degree-five spherical aberration in the entire spherical aberration becomes maximum, it may be an occurrence that the degree-five spherical aberration $W_{60}$ accounts for approximately 40% of the total spherical aberration. Therefore, in a system with a larger value of the numerical aperture NA, it is necessary to take the effect of the degree-five spherical aberration $W_{60}$ sufficiently into consideration.

Specifically, it is supposed that, with the numerical aperture NA=0.6 and the refractive index n of the light transmitting layer 4=1.5, the total aberration ascribable to the thickness error $\Delta t$ is 30 $\mu$m. If the total aberration ascribable to the thickness error $\Delta t$ is found from the above equation (6) which takes the degree-five spherical aberration $W_{60}$ into consideration, it is approximately 1.452 $\mu$m. On the other hand, it is assumed that, with the numerical aperture NA=0.85 and the refractive index of the light transmitting layer 4=1.5, the thickness error $\Delta t$ of the light transmitting layer 4 is 30 $\mu$m. The total aberration ascribable to the thickness error $\Delta t$, as found from the equation (6), is approximately 4.850 $\mu$m. That is, if the thickness tolerance of the light transmitting layer 4 is $\pm$0.03 mm, and the numerical aperture NA is 0.6, the total aberration ascribable to the thickness error $\Delta t$ of the light transmitting layer 4 is not larger than 1.452 $\mu$m. However, if the numerical aperture NA is 0.85, the degree-five spherical aberration W60, in particular, is increased, such that the total aberration is as much as 4.850 $\mu$m at the maximum.

For correcting the above-described spherical aberration, it suffices if the aberration of the same magnitude as and of the opposite sign to the spherical aberration represented by the above equation (6) is produced. The simplest method would be to insert a parallel flat plate between the light source 10 and the collimator lens 13 for correction. If, in this case, the equations (7) and (8)

$$\{(n_1^2+3)/n_1^2\}NA_1^2 = \{(n_0^2+3)/n_0^2\}NA_0^2 \quad (7)$$

$$\{(n_1^3-3)/n_1^3\}NA_1^4 = \{(n_0^2-1/n_0^3)NA_0^4 \quad (8)$$

hold, correction up to the degree-five spherical aberration $W_{60}$ is possible. In these equations, $NA_0$, n1 and $NA_1$ are a refractive index of the light incident side of the collimator lens 13, the refractive index of the light transmitting layer 4 and the numerical aperture of the objective lens 16.

In order for the equations (7) and (8) to hold, the $NA^1$ of the objective lens 16 and the $NA_0$ of the light incident side of the collimator lens 13 need to be of the same order of magnitudes, if the actually feasible value of the refractive index is taken into consideration. Specifically, at least the relation $NA_1/NA_0 \leq 2$ needs to be met. It is however not realistic to increase the value of the $NA_0$ of the light incident side of the collimator lens 13 in keeping with the increase in the $NA_1$ of the objective lens 16. Thus, with the method of inserting the parallel planar plate between the light source 10 and the collimator lens 13, it is not possible to correct the spherical aberration completely.

Moreover, if an optical element other than a parallel planar plate is used, it is difficult to correct the entire spherical aberration completely if simply the optical element is arranged on the optical axis. The reason is that, as may be seen from the equations (1) and (4), the amount of the degree-three spherical aberration $S_{40}$ and that of the degree-five spherical aberration $S_{60}$ differ with the numerical aperture NA. It is therefore desirable to perform the correction in a well-balanced manner so that, in consideration of the thickness tolerance of the light transmitting layer 4, the aberration will be comprised in the tolerated range.

Thus, with the optical head 1 according to the present invention, the well-balanced correction is realized by causing movement of three-dimensional collimator lens 13 along the optical axis by the actuator for the collimator lens 14. By causing movement of the collimator lens 13 in the fore-and-aft direction, the numerical aperture NA of the light incident side of the objective lens 16 is changed to correct the spherical aberration.

Meanwhile, in the present optical head 1, the diameter of the exit pupil of the collimator lens 13 is desirably sufficiently larger than the diameter of the entrance pupil of the objective lens 16. In this case, the numerical aperture NA of the light exit side of the objective lens 16 is maintained substantially constant, even if the numerical aperture NA of the objective lens 16 is varied, thus assuring stable recording/reproduction.

In the optical head, the numerical aperture NA of the light incident side of the collimator lens 13 is set mainly with a view to enhancing the coupling efficiency with the incident laser light radiated from the light source. Specifically, the numerical aperture NA is preferably set to approximately 0.3 or less. On the other hand, a larger value of the numerical aperture NA of the objective lens 16 is preferred for reducing the diameter of the light converged on the recording layer. If it is desired to realize high recording density and high recording capacity exceeding those of the DVD, this numerical aperture NA is desirably set to not less than 0.65.

That is, with the present optical head 1, the numerical aperture NA on the light incident side of the collimator lens 13 is desirably set to a value significantly smaller than the value of the numerical aperture NA on the light exit side of the objective lens 16. In such setting, the spherical aberration produced due to the movement along the optical axis of the collimator lens 13 is mainly the degree-three spherical aberration $W_{40}$. Therefore, it is not possible to remove the entire spherical aberration ascribable to the thickness error $\Delta t$ of the light transmitting layer 4 completely by the movement of the collimator lens 13.

Thus, when the collimator lens 13 is moved, the position of destination of movement of the collimator lens 13 is set so that the mean square value of the aberration will be minimum. Specifically, the optical path difference of the main light beam and the ambient light beam is calculated by the light tracking method and the collimator lens position which will give the minimum value of the mean square value of the optical path difference, that is the wavefront aberration, is previously calculated. In recording/reproducing the optical disc 2, the thickness t of the light transmitting layer 4 is detected and the collimator lens 13 is moved by the actuator for the collimator lens 14 to a position previously calculated depending on an error $\Delta t$.

It is desirable in the optical head 1 that the distance of movement of the collimator lens 13 is sufficiently smaller than the focal length of the collimator lens 13 so that the wavefront aberration W,S generated by the movement of the collimator lens 13 will be sufficiently smaller than the focal length of the collimator lens 13. In such case, the amount of movement of the collimator lens 13 is subsequently proportionate to the amount of the spherical aberration produced by the movement of the collimator lens 13, thus simplifying the structure and the driving method etc of the actuator for the collimator lens 14. Stated differently, it is highly meritorious in the structure of the servo mechanism that the distance of movement of the collimator lens 13 be sufficiently smaller than the focal length of the collimator lens 13.

In the above optical head 1, the spherical aberration attributable to the thickness error $\Delta t$ of the light transmitting layer 4 is corrected by movement of the collimator lens 13. However, the spherical aberration attributable to the thickness error $\Delta t$ of the light transmitting layer 4 may be corrected by any suitable optical device other than the collimator lens.

That is, according to the present invention, it is only sufficient if the optical element used for correcting the spherical aberration attributable to the thickness error $\Delta t$ of the light transmitting layer 4 is arranged between the light source 10 and the objective lens 16. For example, a lens provided between the light source 10 and the collimator lens 13 may be moved in the fore-and-aft direction along the optical axis. Alternatively, the collimator lens 13 may be omitted and the light radiated from the light source 10 may be caused to fall in the state of the divergent light on the objective lens 16. In this case, it is sufficient if the lens is provided on the optical path of the divergent light incident on the objective lens 16 and is moved in the fore-and-aft direction along the optical axis.

However, if the spherical aberration is to be corrected by the collimator lens 13 as in the above optical head 1, and the thickness t of the light transmitting layer 4 is of a prescribed value, the incident laser light on the objective lens 16 is the collimated light, so that the objective lens 16 can be operated as an easy-to-operate infinite system lens. Thus, in actuality, the collimator lens 13 is desirably used as an optical device for spherical aberration correction as in the case of the optical head 1.

Although the foregoing description is made in connection with the correction of the spherical aberration attributable to the thickness error $\Delta t$ of the light transmitting layer 4, it is also possible to cause movement of an optical element arranged for aberration correction in order to detect changes in environment, such as temperature changes, tilt of the optical disc 2 in the radial direction, variations in the refractive index n of the light transmitting layer 4 or mistaken alignment of optical components making up the optical head 1 and in order to correct the aberration caused by these factors.

Meanwhile, it is desired in the optical head 1 to enlarge the numerical aperture NA of the objective lens 16 as compared to that of the DVD for further increasing the recording density. The numerical aperture NA is preferably set to not less than 0.65, as discussed previously.

However, if the numerical aperture NA of the objective lens 16 is increased, there is raised a problem of increased coma aberration, besides that of the above-described spherical aberration. The coma aberration is generated by the radial tilt of the optical disc 2, termed the radial skew, and is increased in proportion to the third power of the numerical aperture NA of the objective lens 16. Thus, with increase in the numerical aperture NA, it becomes more crucial to suppress the coma aberration.

For suppressing the coma aberration, it is effective to reduce the thickness t of the light transmitting layer 4. In a DVD, for example, the skew of the radial skew is ±0.4° and, for maintaining the comparable tolerance value, it suffices if the thickness t of the light transmitting layer 4 is set to satisfy the following equation (9):

$$t \leq 0.1296/NA^3 \tag{9}$$

For example, if $NA \geq 0.65$, it is when $t \leq 0.47$ mm that the equation (9) is met. Thus, if the numerical aperture NA of the objective lens 16 in the optical head 1 is to be not less than 0.65, the thickness t of the light transmitting layer 4 is preferably set to 0.47 mm or less. Thus, if the numerical aperture NA of the objective lens 16 is set to not less than 0.65 to achieve the high recording density, it is possible to maintain the tolerance of the thickness t of the light transmitting layer 4 of a value comparable to that of the conventional DVD.

As may be seen from the above equation (9), if the numerical aperture NA of the objective lens 16 is increased further so that $NA \geq 0.7$, preferably $t \leq 0.37$ mm. If the numerical aperture NA is increased still further so that $NA \geq 0.85$, preferably $t \leq 0.21$ mm.

In general, it is difficult to achieve a narrow radial skew tolerance. If this could be achieved, the cost is raised prohibitively. However, if the thickness t of the light transmitting layer 4 is reduced sufficiently in keeping with the numerical aperture NA of the objective lens 16 to increase the numerical aperture NA of the objective lens 16 to increase the recording density, the radial skew tolerance can be kept at a value comparable to the value of the conventional DVD. Therefore, by reducing the thickness t of the light transmitting layer 4 in keeping with the increase in the numerical aperture NA, it is possible to achieve higher recording density without prohibitive cost rise due to excessive narrowing of the radial skew tolerance.

Figure 2:
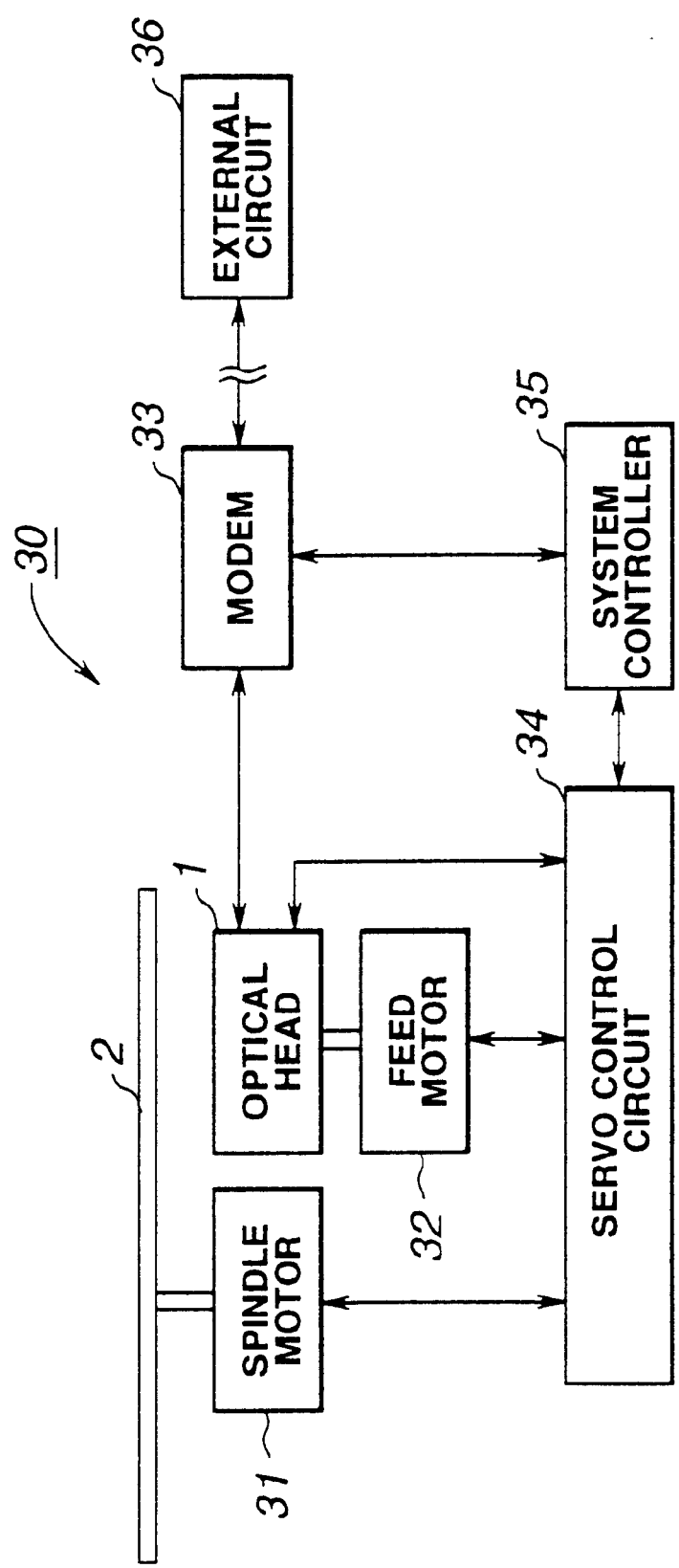
FIG. 2 shows an example of a recording/reproducing apparatus embodying the present invention.

As an embodiment of the recording and/or reproducing apparatus according to the present invention, a recording/reproducing apparatus 30 having the optical head 1 for recording/reproducing the optical disc 2, as shown in FIG. 2, is hereinafter explained.

Although the following description is made with reference to a recording/reproducing apparatus for recording/reproducing the phase-change type optical disc 2, the present invention is applicable to various types of the recording and/or reproducing apparatus having the optical heads. The information recording medium to be recorded and/or reproduced may be a read-only optical disc, a magneto-optical disc or an optical card.

The recording/reproducing apparatus 30 includes a spindle motor 31 for rotationally driving an optical disc 2, the optical head 1 used for recording/reproducing information signals, a feed motor 32 for moving the optical head 1, a modem circuit 33 for performing a modulating/demodulating operation, a servo control circuit 34 for servo-controlling the optical head 1 and a system controller 35 for controlling the entire system.

The spindle motor 31 is driven under control by the servo control circuit 34 and is run in rotation at a pre-set rpm. That is, the optical disc 2 to be recorded or reproduced is chucked by the spindle motor 31 and run in rotation at a pre-set rpm by the spindle motor 31 rotationally driving by the servo control circuit 34.

When recording/reproducing information signals, the optical head 1 illuminates the laser light on the optical disc 2, run in rotation by the optical disc 2, to detect the return light. When recording information signals, signals sent from an external circuit 36 and modulated in a pre-set manner by the modem circuit 33 are sent to the optical head 1, which then illuminates a laser light beam, modulated in light intensity, on the optical disc 2. When reproducing information signals, the optical head 1 illuminates a laser light beam of a constant output on the rotating optical disc 2 and generates playback signals from the return light to send the playback signals to the modem circuit 33.

The optical head 1 is also connected to the servo control circuit 34. During recording/reproduction of information signals, the optical head 1 generates focussing servo signals and tracking servo signals, from the return light reflected from the rotating optical disc 2, as described above, to send the servo signals to the servo control circuit 34.

The modem circuit 33 is connected to the system controller 35 and to the external circuit 36. When recording information signals on the optical disc 2, the modem circuit 33 receives the signals recorded on the optical disc 2 from the external circuit 36, under control by the system controller 35, and modulates the received signals. The signals modulated by the modem circuit 33 are sent to the optical head 1. When reproducing the information signals from the optical disc 2, the modem circuit 33 receives the signals reproduced from the optical disc 2, under control by the system controller 35, to modulate the layback signals. The signals demodulated by the modem circuit 33 are outputted from the modem circuit 33 to the external circuit 36.

The feed motor 32 is adapted to feed the optical head 1 to a pre-set position along the radius of the optical disc 2, and is driven by control signals from the servo control circuit 34. That is, this feed motor 32 is connected to and controlled by the servo control circuit 34.

The servo control circuit 34 controls the feed motor 32, under control by the system controller 35, so that the optical head 1 will be fed to a pre-set position facing the optical disc 2. The servo control circuit 34 is also connected to the spindle motor 31 to control the operation of the spindle motor 31 under control by the system controller 35. That is, the servo control circuit 34 controls the spindle motor 31 so that the optical disc 2 will be rotationally driven at a pre-set rpm during recording/reproduction of the information signals. The servo control circuit 34 is also connected to the optical head 1 and receives the servo signals from the optical head 1 during recording/reproduction of information signals to effect focussing servo control and tracking servo control by the biaxial actuator for the objective lens 17 loaded on the optical head 1 based on the servo signals.

Moreover, in the recording/reproducing apparatus 30 embodying the present invention, the servo control circuit 34 also operates as detection means for detecting the thickness t of the light transmitting layer 4 of the optical disc 2 based on the focussing servo signals. The method for detecting the thickness of the light transmitting layer 4 by the servo control circuit 34 is hereinafter explained.

Among the focussing servo signals, sent from the photodetector 19 of the photodetector 1 to the servo control circuit 34, there are focussing pull-in signals and focussing error signals. The focussing pull-in signals indicate the light volume of the entire return light reflected from the optical disc 2 and are used for causing movement of the objective lens 16 to near the focussing position. The focussing error signals hold the objective lens 16 in the just-focus position after the objective lens 1 is moved to near the focussing position based on the focussing pull-in signals.

The recording/reproducing apparatus 30 acquires the focussing error signals based on the astigmatic aberration method. In the astigmatic aberration method, an optical element, such as a parallel planar plate formed by a glass plate is arranged in a converging optical path of the return light to generate intentionally a large astigmatic aberration to detect a beam shape ahead or at back of the circle of least confusion to derive focussing error signals.

Figure 3:
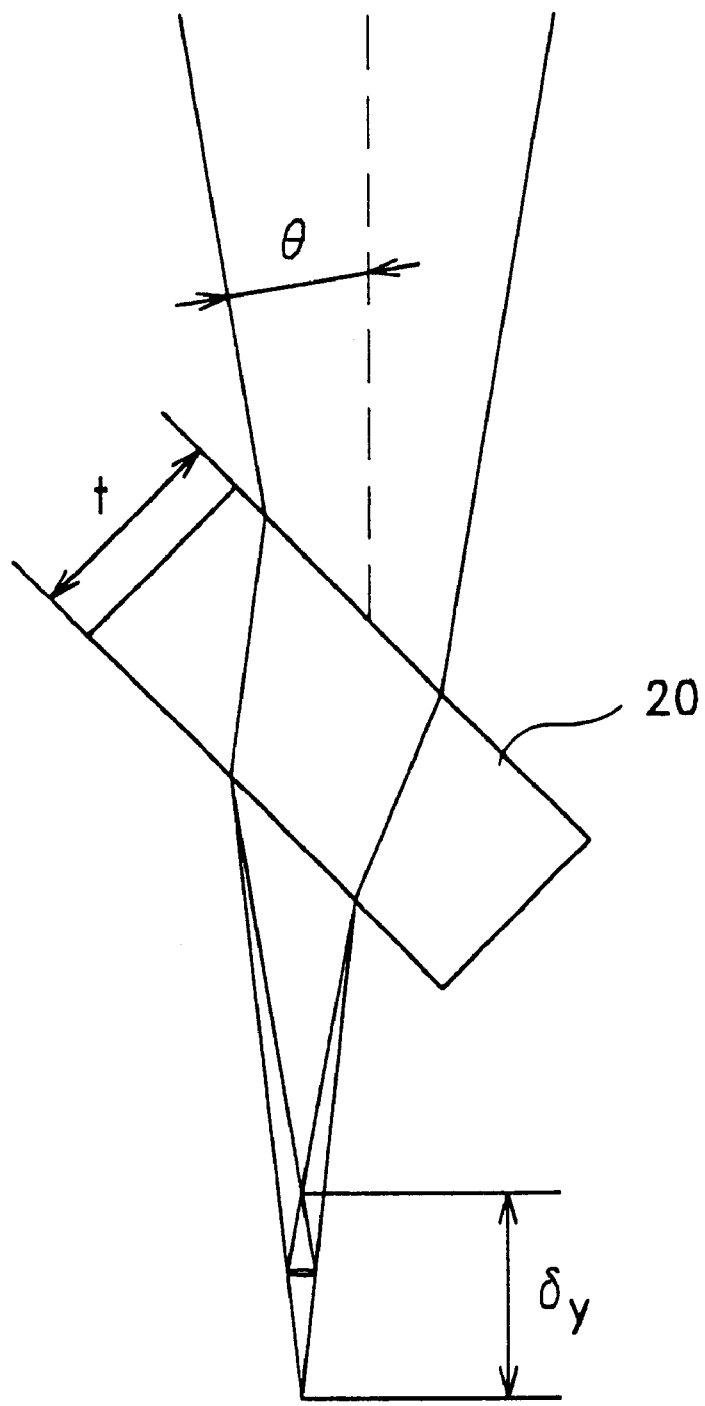
FIG. 3 illustrates astigmatic aberration.

The astigmatic aberration method is explained by taking an example of using a parallel flat plate 20, as shown in FIG. 3. Although the optical head 1 shown in FIG. 1 uses a multiple lens 18 as an optical component for generating the astigmatic aberration, the parallel flat plate 20 is used here as an optical element producing the astigmatic aberration for simplicity.

The amount of the astigmatic aberration δy, in case of using the parallel flat plate 20 as the optical element producing the astigmatic aberration, is given by the following equation (10):

$$\delta y = \{(n^2-1)\sin 2\theta Xt\}/(n^2-\sin 2\theta)3/2 \qquad (10)$$

where θ, n and t denote the angle of the optical return opening, the refractive index of the parallel flat plate 20 arranged in the finite light and its thickness, respectively.

Figure 4:
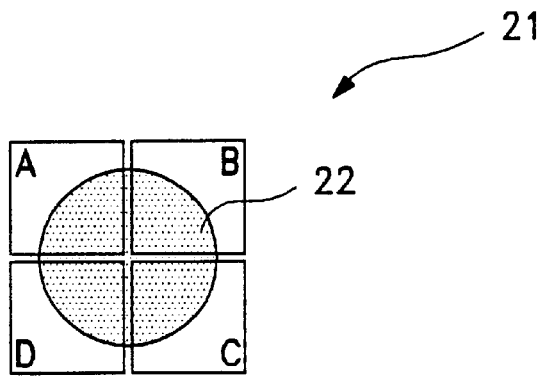
FIG. 4 shows an example of a light receiving unit of a photodetector used in the astigmatic aberration method.
Figure 5:
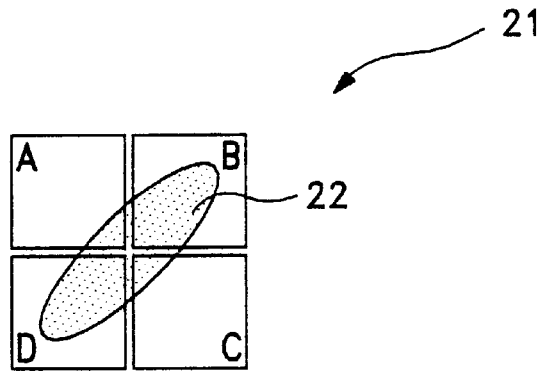
FIG. 5 shows another example of a light receiving unit of a photodetector used in the astigmatic aberration method.
Figure 6:
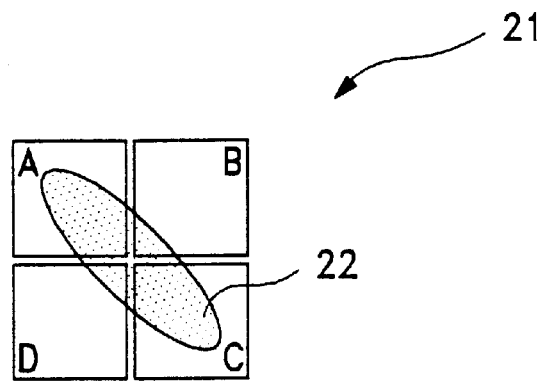
FIG. 6 shows yet another example of a light receiving unit of a photodetector used in the astigmatic aberration method.

For detecting the focussing error signals by the astigmatic aberration method, the light beam, to which has been accorded the astigmatic aberration, is detected by a photodetector. FIGS. 4 to 6 show a light receiving section 21 of a photodetector adapted for detecting the focussing error signals by the astigmatic aberration method. This light receiving section 21 is rectangular in shape and is split into four segments by two perpendicular splitting lines. When the laser light is in the just-focus state on the recording layer of the optical disc, if the photodetector is set so that a beam spot 22 on the light receiving section 21 will be a circle of least confusion, the beam spot 22 on the light receiving section 21 is turned into a spot of an elliptical shape in the non-focussed state. If the segments of the light receiving section 21 are denoted as A, B, C and D, the focussing error signals FE are obtained as voltage signal FE=(A+C)−(B+D), by the amplification calculations performed on the light volume received by the light receiving section 21 by a current-voltage converting amplifier.

If the laser light is focussed on the recording layer of the optical disc, the beam spot 22 on the lead-in area 21 is of an elliptical shape, as shown in FIG. 4. The light volume in the respective segments of the light receiving section 21 is (A+C)=(B+D), with FE=0.

If the recording layer of the optical disc is closer than the focussing point of the laser light, the beam spot 22 on the light receiving section 21 is of an elliptical shape, as shown in FIG. 5. The light volume in the respective segments of the light receiving section 21 is (A+C)<(B+D), with FE<0.

If the recording layer of the optical disc is more remote than the focussing point of the laser light, the beam spot 22 on the light receiving section 21 is of an elliptical shape, as shown in FIG. 6. The light volume in the respective segments of the light receiving section 21 is (A+C)>(B+D), with FE>0.

Figure 7:
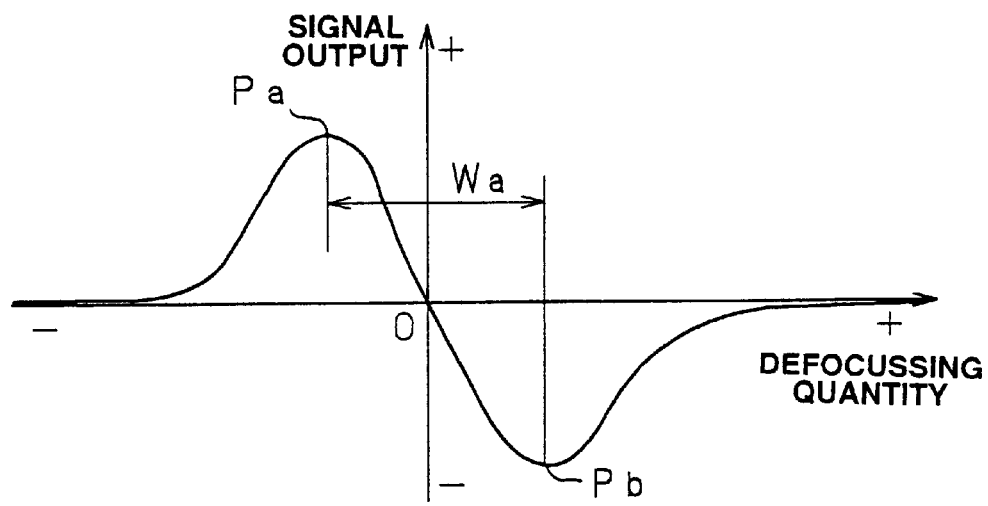
FIG. 7 illustrates an S-shaped curve appearing in focussing error signals.

The focussing error signals, thus obtained, are represented by an S-shaped curve, as shown in FIG. 7, if the focussing deviation is plotted on the abscissa and the output of the focussing error signals is plotted on the ordinate. A null point at the center of the S-shaped curve represents a just-focus point. Meanwhile, a range Wa from one of the peaks Pa to the opposite side peak Pb of the S-shaped curve is generally termed a focussing pull-in range.

In effecting the focussing servo in the optical head 1, the biaxial actuator for the objective lens 17 is driven, as the focussing pull-in signals are detected, in order to cause movement of the objective lens 16 in the fore-and-aft direction along the optical axis. The focal point of the objective lens is caused to be positioned near the recording layer based on the focussing pull-in signals. When the focal point of the objective lens 16 is positioned near the recording layer and the objective lens 16 is in the focussing pull-in range, the objective lens 16 is subsequently moved in the fore-and-aft direction along the optical axis by the biaxial actuator for the objective lens 17 so that the just-focus position is perpetually maintained; that is, so that the focussing error signals will perpetually be at the zero point. This perpetually sets the focussed state with respect to the recording layer.

The principle of the focussing servo is as described above. In the conventional recording/reproducing apparatus, the focussing error signals FE by the return light reflected from the recording layer are used to effect the focussing servo. However, the incident laser light is reflected not only by the recording layer but also by the surface of the optical disc 2, that is on the surface of the light transmitting layer 4, albeit to a lesser extent. The S-shaped curve shown in FIG. 7 appears due to the return light reflected by the surface of the light transmitting layer 4. In the following explanation, the S-shaped curve appearing in the focussing error signals due to the return light reflected by the surface of the light transmitting layer 4 is termed a first S-shaped curve, while that appearing in the focussing error signals due to the return light reflected by the recording layer of the optical disc 1 is termed a second S-shaped curve.

The recording/reproducing apparatus 30 according to the present invention detects the thickness t of the light transmitting layer 4 based on the focussing error signals corresponding to the first and second S-shaped curves. That is, in the recording/reproducing apparatus 30 of the present invention, the objective lens 16 is moved along the optical axis by the biaxial actuator for the objective lens 17, prior to the recording/reproducing operation, until the focal position of the objective lens reaches from the surface of the light transmitting layer 4 to the recording layer. The thickness t of the light transmitting layer 4 is detected based on the movement speed of the objective lens 16 and the focussing error signals corresponding to the first and second S-shaped curves.

Figure 8:
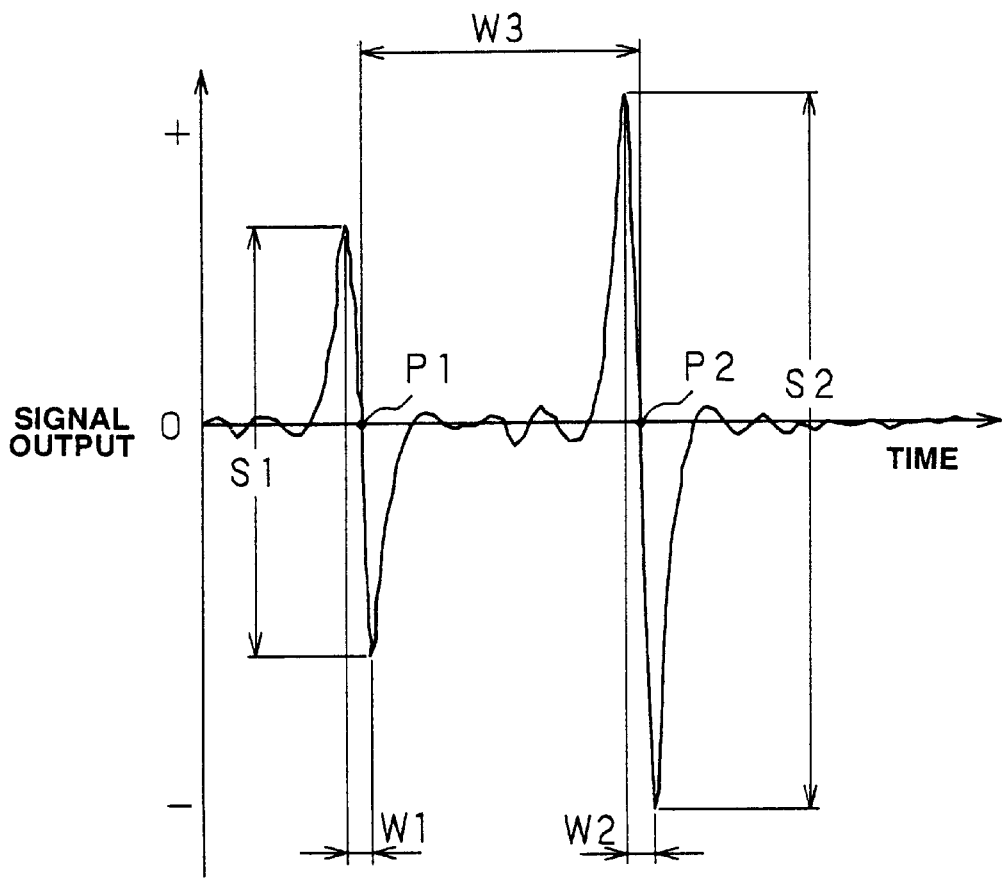
FIG. 8 shows an output of the focussing error signals when the objective lens is moved along the optical axis in a direction approaching the optical disc.

Referring to FIG. 8, an illustrative example is now explained. In FIG. 8, showing the output of the focussing error signals when the objective lens 16 is moved along the optical axis in a direction approaching the optical disc 2, the abscissa and the ordinate represent the time and the output of the focussing error signals, respectively.

In FIG. 8, W1 is the time necessary for the objective lens 16 to traverse the focussing pull-in range in the first S-shaped curve. That is, W1 denotes the time which elapses until the focussing error signals move from the maximum value to the minimum value on the first S-shaped curve by the movement of the objective lens 16, while P1 denotes a point of focusing on the surface of the light transmitting layer 4 of the optical disc 2, that is the just-focus point with respect to the surface of the light transmitting layer 4.

In FIG. 8, W2 is the time necessary for the objective lens 16 to traverse the focussing pull-in range in the second S-shaped curve. That is, W2 denotes the time which elapses until the focussing error signals move from the maximum value to the minimum value on the second S-shaped curve by the movement of the objective lens 16, while P2 denotes a point of focusing on the surface of the light transmitting layer 4 of the optical disc 2, that is, the just-focus point with respect to the recording layer.

Also, in FIG. 8, W3 denotes the time which elapses from the point PI focussed on the surface of the light transmitting layer 4 of the optical disc 2 until the point P2 focussed on the recording layer of the optical disc 2.

If, at this time, the length of the focussing pull-in range is A, the thickness t of the light transmitting layer 4 is given by the following equation (11):

$$t = W_3 X \{ (A/W_1)^2 + (A/W_3)^2 \}^{1/2} \qquad (11).$$

Meanwhile, the length of the focussing pull-in range A is set to 20 μm or thereabouts in a majority of currently used optical heads In the recording/reproducing apparatus 30 according to the present invention, the servo control circuit 34 finds the thickness t of the light transmitting layer 4 based on the above equation (11). Thus, the servo control circuit 34 of the recording/reproducing apparatus 30 operates as thickness detection means for detecting the thickness t of the light transmitting layer 4.

Although the thickness t of the light transmitting layer 4 can be detected only once, it is preferably detected a number of times on end to find an average value. That is, in detecting the thickness t of the light transmitting layer 4, the biaxial actuator for the objective lens 17 is repeatedly moved back and forth at a pre-set frequency, such as at 100 to 200 Hz, to find the thickness t of the light transmitting layer 4 repeatedly to find its average value. This enables more accurate detection of the thickness t of the light transmitting layer 4.

The servo control circuit 34, which has detected the thickness t of the light transmitting layer 4 as described above, sends a control signal to the optical head 1 in order to cause movement of the collimator lens 13 by the actuator for the collimator lens 14 to minimize the spherical aberration attributable to the thickness error of the light transmitting layer 4 based on the control signal. After correcting the spherical aberration attributable to the thickness error of the light transmitting layer 4, the recording/reproducing apparatus 30 performs the recording/reproducing operation, as in the case of the conventional recording/reproducing apparatus.

Thus, in the present recording/reproducing apparatus 30, the thickness t of the light transmitting layer 4 is measured prior to the recording/reproducing operation to correct the spherical aberration attributable to the thickness error. Thus, even if there is any thickness error in the thickness t of the light transmitting layer 4, it is possible to suppress the occurrence of the spherical aberration to effect the recording/reproducing operation under an optimum state.

Figure 9:
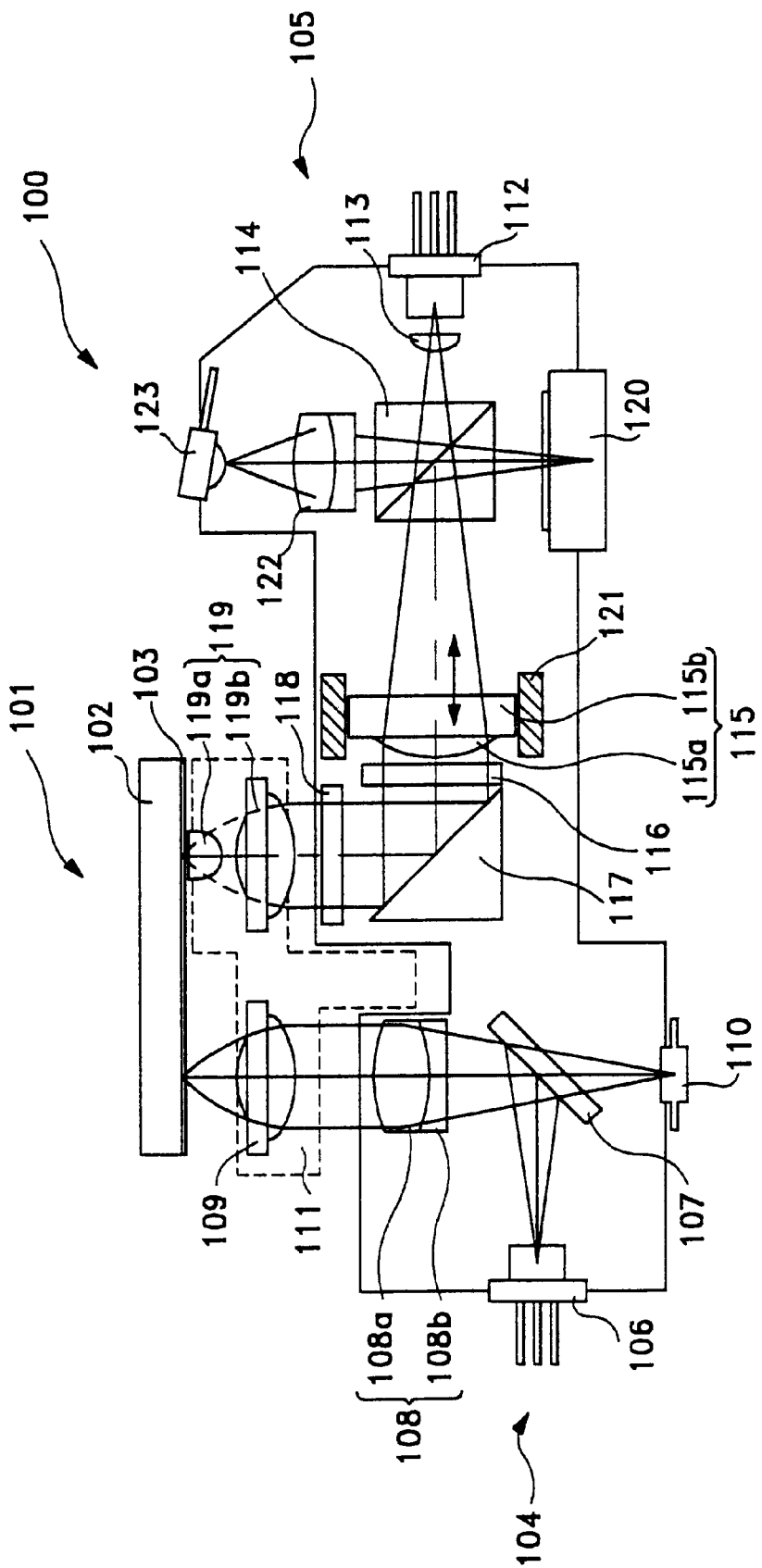
FIG. 9 shows another embodiment of an optical head embodying the present invention.
Figure 10:
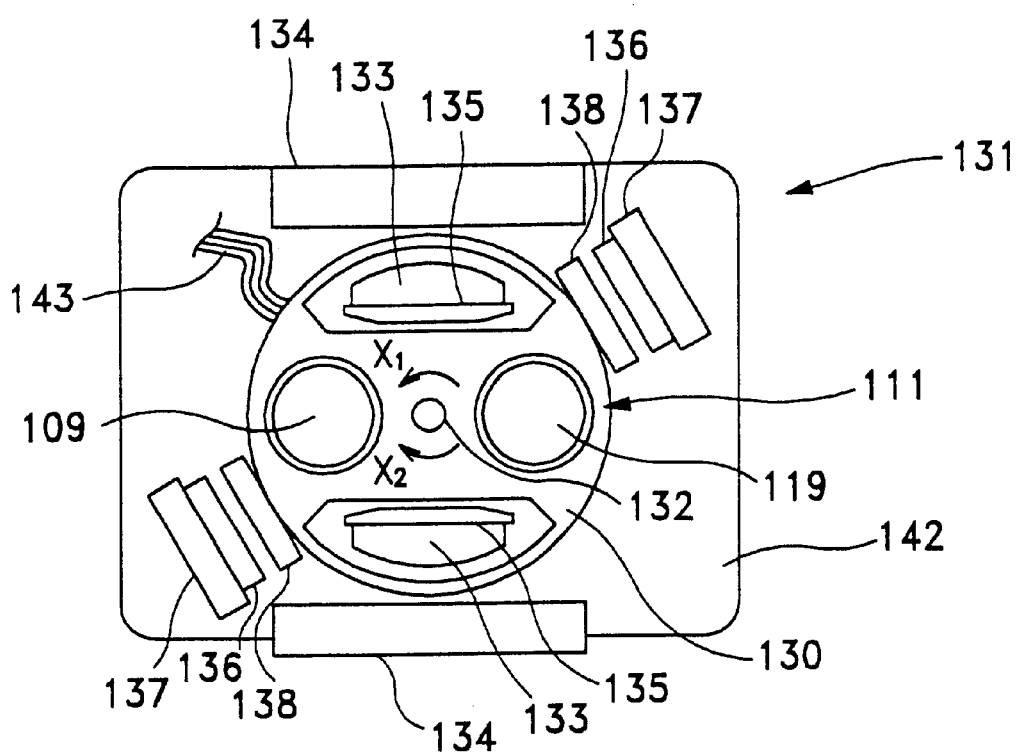
FIG. 10 is a plan view showing an embodiment of a biaxial actuator used in the optical head of FIG. 8.
Figure 11:
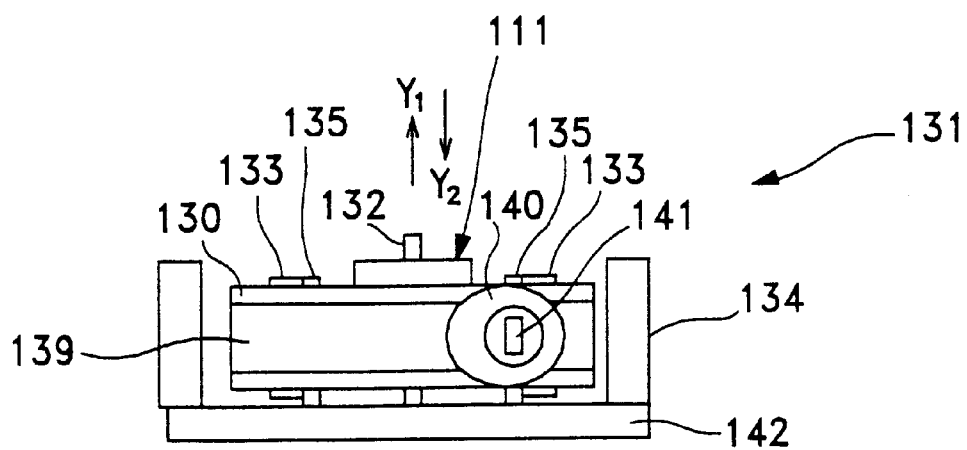
FIG. 11 is a side view showing an embodiment of a biaxial actuator used in the optical head of FIG. 8.

With an optical head of the present invention, it is sufficient if an optical element having a pre-set refractive power is moved to cancel the spherical aberration depending on the thickness of the light transmitting layer and hence the optical head is not limited to the structure shown in FIG. 1. Referring to FIGS. 9 to 11, modifications of the optical head of the present invention are explained in detail.

An optical head 100, shown in FIG. 9, is an optical head used in recording/reproducing a phase-change optical disc 101. An optical disc 101, adapted to be recorded/reproduced by the optical head 100, has a substrate 102, a recording layer formed thereon for recording information signals by phase change and a light transmitting layer 103 formed on the recording layer. The optical disc 101 is recorded or reproduced by the light incident on the side of the light transmitting layer 103.

The optical head 100 includes a first optical system 104 for detecting the thickness of the light transmitting layer 103 of the optical disc 101 and a second optical system 105. In recording/reproducing information signals for the optical disc 101, the second optical system 105 corrects the spherical aberration attributable to the thickness error of the light transmitting layer 103 of the optical disc 101 based on the thickness of the light transmitting layer 103 of the optical disc 101 detected by the first optical system 104.

The first optical system 104 includes a light source 106, a polarizing beam splitter 107, a collimator lens 108, an objective lens 109 and a photodetector 110.

The light source 106 radiates light to the optical disc 101. As the light source 106, a semiconductor laser emitting a short-wavelength laser with the wavelength of 635 to 650 nm is used. The laser light emitted by the light source 106 is reflected by the polarizing beam splitter 107 to fall on the collimator lens 108.

The laser light incident on the collimator lens 108 is collimated by the collimator lens 108, which is composed of two spherical lenses 108a, 108b bonded together. The laser light, collimated by the collimator lens 108, falls on the objective lens 109.

The laser light incident on the objective lens 109 is converged by the objective lens 109 to fall via the light transmitting layer 103 on the recording layer of the optical disc 101. The objective lens 109 is loaded on a biaxial actuator 111 so as to be moved in a direction along the optical axis and in a direction perpendicular thereto.

The laser light converged by the objective lens 109 to fall on the recording layer of the optical disc 101 is reflected by the recording layer as a return light beam. This return light beam is caused to retrograde along the original optical path to traverse the polarizing beam splitter 107 so as to be incident on and detected by the photodetector The first optical system 104 detects the thickness of the light transmitting layer 103 of the optical disc 101 from the focussing error signals on the surface of the light transmitting layer 103 and the recording layer of the optical disc 101.

The second optical system 105 includes a light source 112, a cylindrical lens 113, a polarizing beam splitter 114, a collimator lens 115, a diffraction lattice 116, an optical path uplifting mirror 117, a quarter wave plate 118, a set of two objective lenses 119 and a photodetector 120.

The light source 112, comprised of a semiconductor laser emitting a short-wavelength laser of the wavelength of 400 to 650 nm, radiates light towards the optical disc 101. The laser light radiated from the light source 112 falls on the cylindrical lens 113.

The laser light incident on the collimator lens 115 is beam-shaped by the cylindrical lens 113 and thence transmitted through the polarizing beam splitter 114 to fall on the collimator lens 115.

If the thickness of the light transmitting layer 103 of the optical disc 101 is of a predetermined value, the laser light is incident on and collimated by the collimator lens 1, which is comprised of two spherical lenses bonded together. This collimator lens 115 is loaded on an actuator for the collimator lens 121 and is thereby moved back and forth along the optical axis of the incident laser light.

If the thickness t of the light transmitting layer 103 of the optical disc 101 is off the prescribed value, the collimator lens 115 is collimated by the collimator lens 115 to correct the spherical aberration ascribable to the thickness error of the light transmitting layer 103. That is, if the thickness t of the light transmitting layer 103 of the optical disc 101 is off the prescribed value, the incident laser light is turned by the collimator lens 115 into a diverging light or the converging light in order to correct the spherical aberration ascribable to the thickness error of the light transmitting layer 103. The laser light outgoing from the collimator lens 115 falls on the diffraction lattice 116.

The laser light incident on the diffraction lattice 116 is diffracted by the diffraction lattice 116 into a three-beam laser light. This diffraction lattice 116 serves for splitting the laser light into at least three beams to enable tracking servo by the so-called three-spot method. The laser light radiated from the diffraction lattice 116 has its proceeding direction bent by the optical path uplifting mirror 117 to fall on the quarter wave plate 118.

The laser light incident on the quarter wave plate 118 is turned from the linear polarized state to a circular polarized state. The laser light outgoing from the quarter wave plate 118 falls on the set of two objective lenses 119.

The laser light incident on the set of two objective lenses 119 is converged thereby to fall on the recording layer of the optical disc 101 via the light transmitting layer 103. The set of two objective lenses 119, made up of two lenses 119a, 119b, is loaded on the biaxial actuator 111 and is thereby moved in the direction along the optical axis and in the direction perpendicular thereto.

The incident laser light, converged by the set of two objective lenses 119 to fall on the recording layer of the optical disc 101, is reflected by the recording layer as a return light beam, which is then caused to retrograde along the ongoing optical path to traverse the set of two objective lenses 119 so as to be converged by the collimator lens 115. The resulting converged light is reflected by the polarizing beam splitter 114 so as to be incident on and detected by the photodetector 120.

Referring to FIG. 9, the second optical system 105 includes a converging lens 122 for converging the laser light reflected by the polarizing beam splitter 114 and an output adjustment photodetector 123 for receiving the laser light converged by the converging lens 122 for automatically adjusting an output of the laser light radiated from the light source 112 based on the received light volume.

With the present optical head 100, the objective lens 109 of the first optical system 104 and the set of two objective lenses 119 of the second optical system 105 are loaded on the biaxial actuator 111 and are thereby moved in the biaxial directions to effect tracking control and focussing control for the optical disc 101.

FIGS. 10 and 11 show an illustrative structure of the biaxial actuator 111. This biaxial actuator 111 includes a bobbin 130 carrying the objective lens 109 and the set of two objective lenses 119 and an electromagnetic driving mechanism 131 for causing movement of the bobbin 130 in two perpendicular directions.

Referring to FIGS. 10 and 11, the bobbin 130 is formed substantially as a cylinder having a top plate and has its center supported by a supporting shaft 132. The bobbin 130 is supported for rotation about and for sliding along the axis of the supporting shaft 132. The objective lens 109 and the set of two objective lenses 119 are mounted on this bobbin 130 in point symmetry on both sides of the supporting shaft 132 so that the optical axes thereof run parallel to each other.

Referring to FIGS. 10 and 11, the electromagnetic driving mechanism 131 for causing movement of the bobbin 130 includes a magnetic circuit having a focussing magnet 133, a pair of focussing yokes 134, 135, a tracking magnet 136, a pair of tracking yokes 137, 138, a focussing coil 139 and a tracking coil 140.

Within the inside of the tracking coil 140 of the electromagnetic driving mechanism 131 is fixedly mounted a metal piece 141 for setting the neutral position of the bobbin 130, as shown in FIG. 11. By the metal piece 141 being attracted towards the boundary of the two poles of the tracking magnet 136 split into the two planar poles, the bobbin 130 is set at the neutral position in the tracking direction as the second direction, while being set at the neutral position in the focussing direction as the first direction. The bobbin 130 is held on a supporting base block 142, carrying the supporting shaft 132, at a neutral position by a neutral position supporting mechanism constituted by resilient rubber etc.

The bobbin 130, thus kept at the neutral position, is slid along the axis of the supporting shaft 132 and rotated about the axis of the supporting shaft 132, under driving by the electromagnetic driving mechanism 131.

That is, the electromagnetic driving mechanism 131 causes the bobbin 130 to be moved along the axis of the supporting shaft 132 by the focussing error signals being sent via a flexible substrate 143 to the focussing coil 139. By the sliding movement of the bobbin 130 along the axis of the supporting shaft 132, focussing control is performed on the set of two objective lenses 119 with respect to the optical disc 101.

On the other hand, the electromagnetic driving mechanism 131 causes the bobbin 130 to be rotated about the axis of the supporting shaft 132 by the tracking error signals being sent via a flexible substrate 143 to the tracking coil 140. By the rotation of the bobbin 130 about the axis of the supporting shaft 132, tracking control is performed on the set of two objective lenses 119 with respect to the optical disc 101.

In the optical head 100, the so-called astigmatic aberration method and three-spot method are used as the focussing servo and tracking servo methods, respectively. The astigmatic aberration method detects the reflected laser light from the optical disc via a cylindrical lens and so forth by a four-segment photodetector and finds the sum and/or the difference of detection outputs obtained from the respective segments to derive focussing error signals as the defocussing components of the laser light with respect to the recording layer.

The three-spot method splits a sole laser light beam, outgoing from the light source, into a sole main laser light beam (zeroth order beam) and two sub-beams (± first order beam), using a diffraction lattice and so forth, to illuminate the two sub-beams ahead and at back of the main laser light beam illuminated on the recording track center. The reflected light beams of the sub-beams illuminated ahead and at back of the main laser light beam are detected by a photodetector having two light receiving sections to find the difference between the detection outputs derived from the light receiving sections to derive the tracking error signals as the offset components of the main light beam with respect to the recording track.

For reproducing the optical disc 110 using this optical head 100, the first optical system 104 detects the thickness of the light transmitting layer 103 of the optical disc 101 from the focussing error signals on the recording layer and the surface of the light transmitting layer 103 of the optical disc 101. That is, the biaxial actuator 111 of the first optical system 104 causes movement of the objective lens 109 back and forth along the optical axis by the biaxial actuator 111 to detect the thickness of the light transmitting layer 103 from the equation (11) based on the movement speed of the objective lens 109 and the first and second S-shaped curves exhibited in the focussing error signals.

The thickness of the light transmitting layer 103 of the optical disc 101, detected by the first optical system 104, is determined in accordance with tables or functions calculated and pre-set by control circuits, not shown. The control circuit, which has determined the thickness of the light transmitting layer 103, determines the operation for correcting the spherical aberration ascribable to the thickness error of the optical disc 101 and sends out control signals instructing the operation thereof to the second optical system 105. Based on these control signals, the second optical system 105 causes the functional or stepped movements of the collimator lens 115 by the actuator for the collimator lens 121 for minimizing the spherical aberration ascribable to the thickness error of the light transmitting layer 103.

After correcting the spherical aberration ascribable to the thickness error of the light transmitting layer 103, the second optical system 105 effectuates the recording/reproducing operation for the optical disc 101. By moving the collimator lens 115 to its optimum position in this manner by the actuator for the collimator lens 115, the spherical aberration produced due to the thickness error of the light transmitting layer 103 can be corrected to produce optimum signals.

In reproducing the optical disc 101 in the second optical system 105, the first optical system 104 operates as an optical system for detecting the working distance in the second optical system 105, that is the separation between the optical disc 101 and the set of two objective lenses 119.

In the second optical system 105, which performs the focussing pull-in operation by movement of the set of two objective lenses 119 along the optical axis, the focussing pull-in range is narrow, because of the high NA of the set of two objective lenses 119, such that the working distance between the optical disc 101 and the set of two objective lenses 119 is e.g., not larger than 0.5 mm. Thus, if the optical disc 101 is subjected to surface deviations or the height of the optical disc 101 is deviated from a reference value, there is a risk that the optical disc 101 collides against the set of two objective lenses 119 during focussing pull-in operation.

Thus, when the second optical system 105 performs focussing pull-in operation, the first optical system 104 is used as auxiliary means to prohibit collision of the optical disc 101 against the set of two objective lenses 119.

That is, when the second optical system 105 performs focussing pull-in operation, the laser light radiated from the light source 106 is illuminated on the optical disc 101 and the reflected light is received by the photodetector 110 to detect focussing error signals. Based on these focussing error signals, approximate positions of the set of two objective lenses 119 loaded on the bobbin used in common with the objective lens 109 of the first optical system 104 is detected. Based on the position information of the set of two objective lenses 119, as detected by the first optical system 104, the optical head 100 actuates the biaxial actuator 111 to prohibit collision of the optical disc 101 against the set of two objective lenses 119.

Meanwhile, if the set of two objective lenses 119 has deviated the focussing pull-in range of the first optical system 104 significantly, it is also not possible for the first optical system 104 to produce focussing error signals. The entire reflected light from the optical disc 101 then is detected by the first optical system 104 and, based on the detected level, the set of two objective lenses 119 is pulled into the focussing pull-in range i-the first optical system 104.

Thus, with the present optical head 100, the first optical system 104 is used as an auxiliary optical system for focussing pull-in for reproducing the optical disc 101 by the second optical system 105, positive focussing pull-in can be realized, despite surface or height deviations of the optical disc 101, without collision of the set of two objective lenses 119 against the optical disc 101.

The auxiliary function for focussing pull-in for the first optical system 104 or the working distance detection method can be realized by methods other than the astigmatic aberration method, such as a differential concentric circle method.

Figure 12:
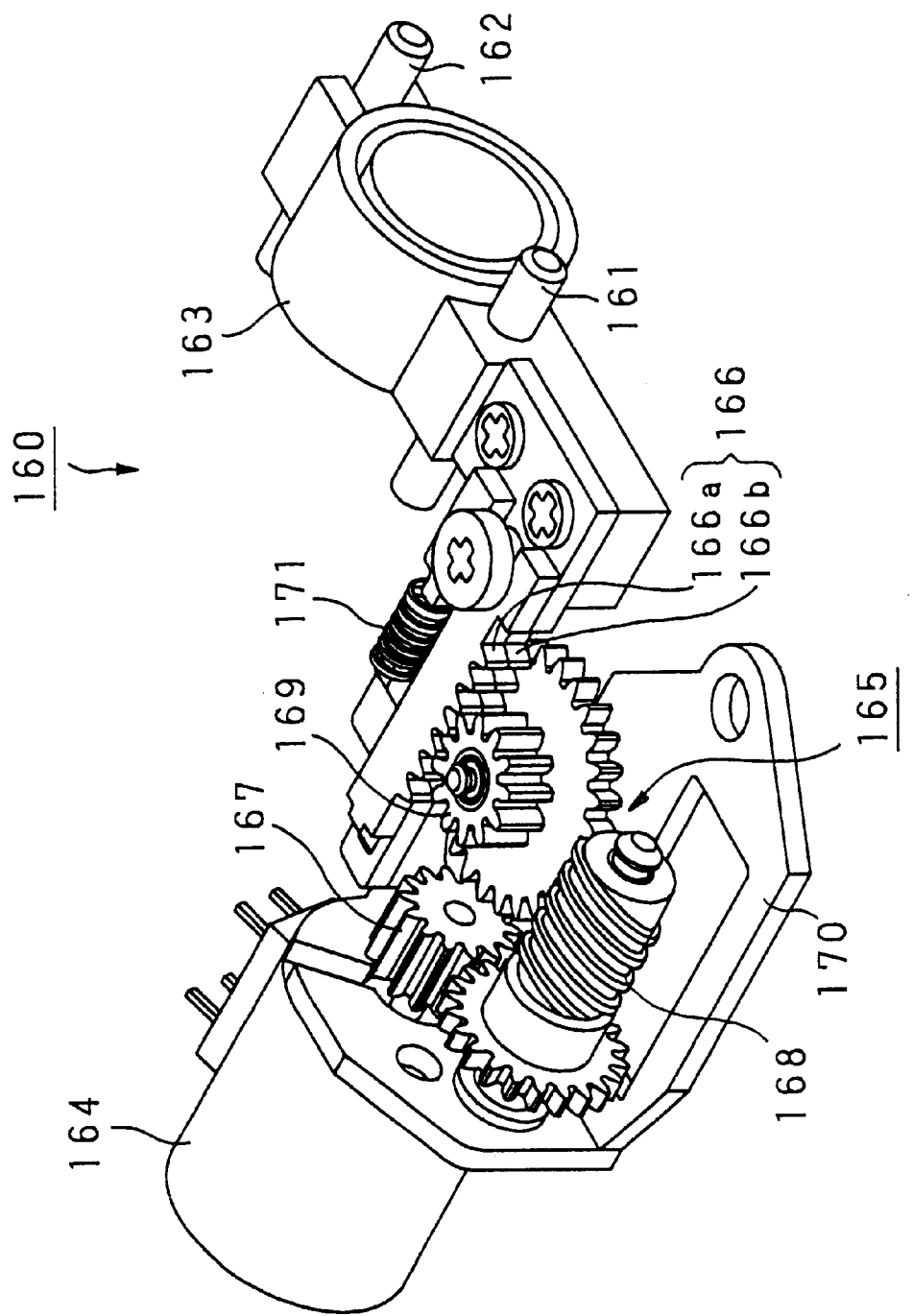
FIG. 12 is a perspective view showing an illustrative structure of a lens driving unit.
Figure 13:
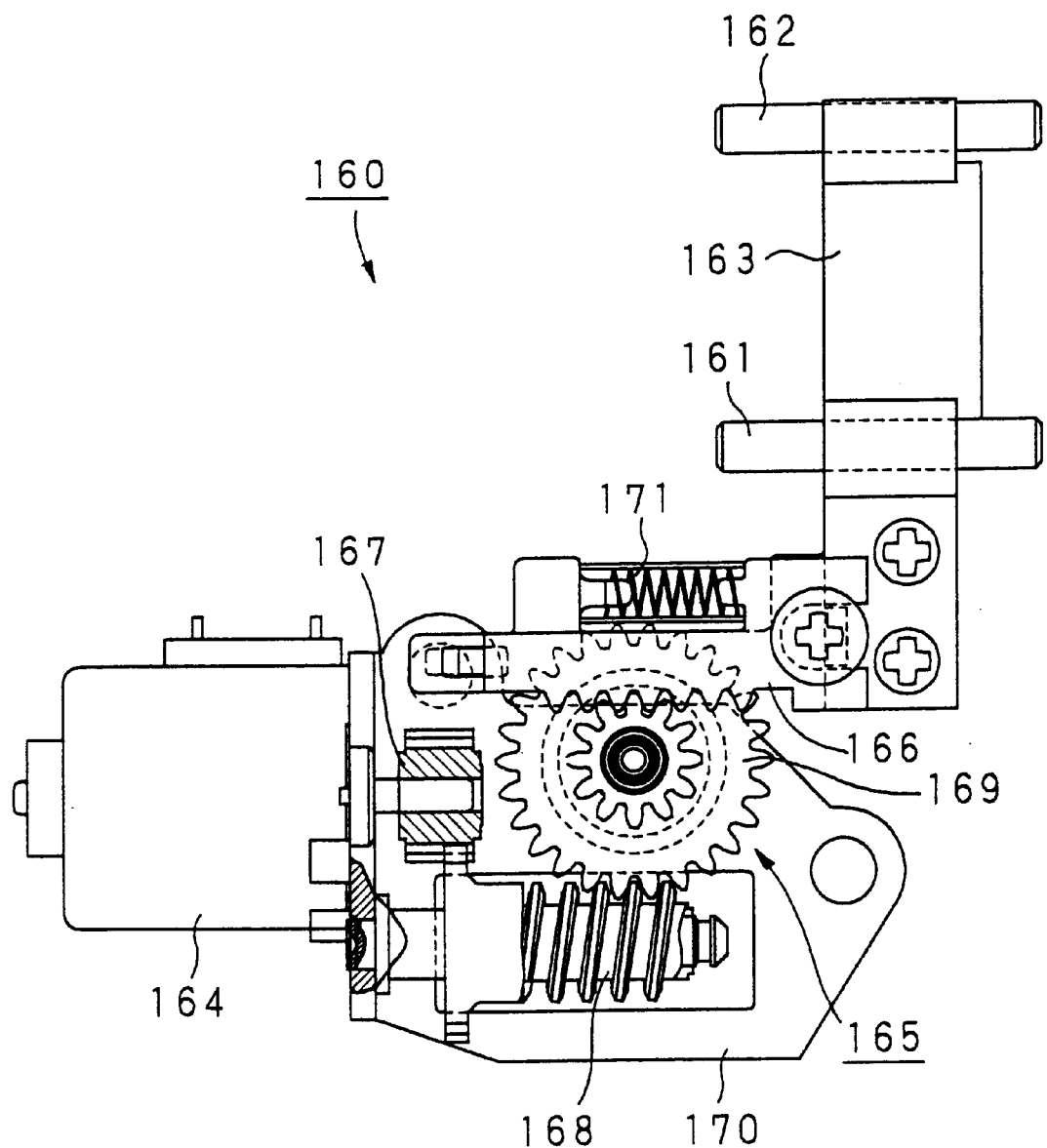
FIG. 13 is a plan view showing the lens driving unit shown in FIG. 12.

The optical head 1 uses the actuator for the collimator lens 14 as movement means for the collimator lens 13 in a direction of cancelling the spherical aberration depending on the thickness of the light transmitting layer 4 of the optical disc 2. The optical head 1 also uses the actuator for the collimator lens 121 as movement means for causing movement of the collimator lens 115 in a direction of cancelling the spherical aberration depending on the thickness of the light transmitting layer 103 of the optical disc 101. Referring to FIGS. 12 and 13, an illustrative structure of these movement means (termed herein a lens driving mechanism) is now explained.

A lens driving mechanism 160, shown in FIGS. 12 and 13, causes movement of the collimator lens in a direction of cancelling the spherical aberration depending on the thickness of the light transmitting layer of an information recording medium. The lens driving mechanism 160 thus includes a reference shaft 161 arranged parallel to the optical axis, a sub-reference shaft 162 arranged parallel to the optical axis, and a collimator lens holder 163 supported by these reference shafts 161, 162.

The reference shaft 161 and the sub-reference shaft 162 are mounted on and secured to a stationary portion of the optical head. The collimator lens holder 163 is supported for sliding movement along the optical axis relative to these reference shafts 161, 162. The collimator lens, moved for cancelling the spherical aberration, is loaded on this collimator lens holder 163. That is, by causing movement of the collimator lens holder 163 back and forth along the reference shafts 161, 162, the lens driving mechanism 160 causes translating movement of the collimator lens loaded on the collimator lens holder 163 back and forth relative to the optical axis direction.

The lens driving mechanism 160 also includes, as a driving mechanism for causing movement of the collimator lens holder 163 back and forth along the reference shaft 161 and the sub-reference shaft 162, a dc motor 164, as a driving source for causing movement of the collimator lens holder 163, and a gearing 165 for converting the rotational movement of the dc motor 164 into a translating movement along the optical axis to transmit the translating movement to the collimator lens holder 163. By converting the rotation of the collimator lens holder 163 by the gearing 165 into a translating movement along the optical axis for causing movement of the collimator lens holder 163, the collimator lens is moved in a direction of cancelling the spherical aberration depending on the thickness of the light transmitting layer of the information recording medium.

The gearing 165 includes a rack 166, mounted on the collimator lens holder 163, a first gear 167 mounted on the rotary shaft of the dc motor 164 for transmitting the power of rotation of the dc motor 164, a second gear 168 for converting the rotation of the dc motor 164 to a translating movement along the optical axis and a third gear 169 for transmitting the driving power converted into the translating movement along the optical axis by the second gear 168 to a rack 166.

The lens driving mechanism 160 includes a base block 170, mounted on the stationary portion of the optical head. The dc motor 164, second gear 168 and the third gear 169 are mounted on this base block 170. The rack 166, to which the driving power is transmitted from the third gear 169, is of a double-rack structure of two racks 166a, 166b for removing the backlash between the rack 166 and the third gear 169. These racks 166a, 166b are interconnected by a spring 171.

If the collimator lens is to be moved by this lens driving mechanism 160, the dc motor 164 is rotated, thereby rotating the first gear 167. This rotation of the first gear 167 is transmitted to the second gear 168 for conversion to the translating movement along the optical axis. The driving power, converted by the second gear 168 into the translating movement along the optical axis, is transmitted via the third gear 169 to the rack 166.

This rack 166 is mounted on the collimator lens holder 163 which is supported for sliding along the optical axis with respect to the reference shafts 161, 162. Thus, the collimator lens holder 163 is moved along the optical axis by the driving force transmitted via the third gear 169 to the rack 166 to cause movement of the collimator lens carried by the collimator lens holder 163 along the optical axis.

With the above-described lens driving mechanism 160, the collimator lens can be moved highly accurately. Thus, by using this lens driving mechanism 160, the spherical aberration ascribable to variations in the thickness of the light transmitting layer can be cancelled out sufficiently.

It is assumed that, in the above-described lens driving mechanism 160, a pulse driving type stepping motor is used as the dc motor 164, and the movement distance of the collimator lens per one-pulse rotation is 13.8 $\mu$m. If this is used in the optical system of the Example as later explained, the amount of spherical aberration correction per one-pulse rotation of the dc motor is equivalent to approximately 0.2 $\mu$m in terms of the thickness variation of the light transmitting layer. This is sufficient to correct the spherical aberration ascribable to thickness variation of the light transmitting layer.

Moreover, the above-described lens driving mechanism 160 is simpler in structure and can be reduced in size and cost.

In the below, preferred embodiments of the optical system of the optical head embodying the present invention are explained.

In the following description, a specified example of the ongoing optical system inclusive of the collimator lens is given for illustrating the correction of the spherical aberration by the movement of the collimator lens. It is noted that the distance or precision of the collimator lens movement is dependent solely on the numerical aperture NA of the light outgoing side of the objective lens and on the thickness of the light transmitting layer formed on the recording layer of the optical disc, without dependency on the designing of the objective lens. Therefore, specified numerical values of the numerical aperture NA on the light exit side of the objective lens are given, while other lens data are omitted.

Also, in the following description, an example of using a bonded spherical lens as the collimator lens (Example 1) and an example of using a surface phase type hologram lens as the collimator lens (Example 2) are explained. However, a non-spherical lens or a Fresnel lens and so forth may be used as the collimator lens. Also, a so-called volume phase type hologram lens may also be used.

EXAMPLE 1

Figure 14:
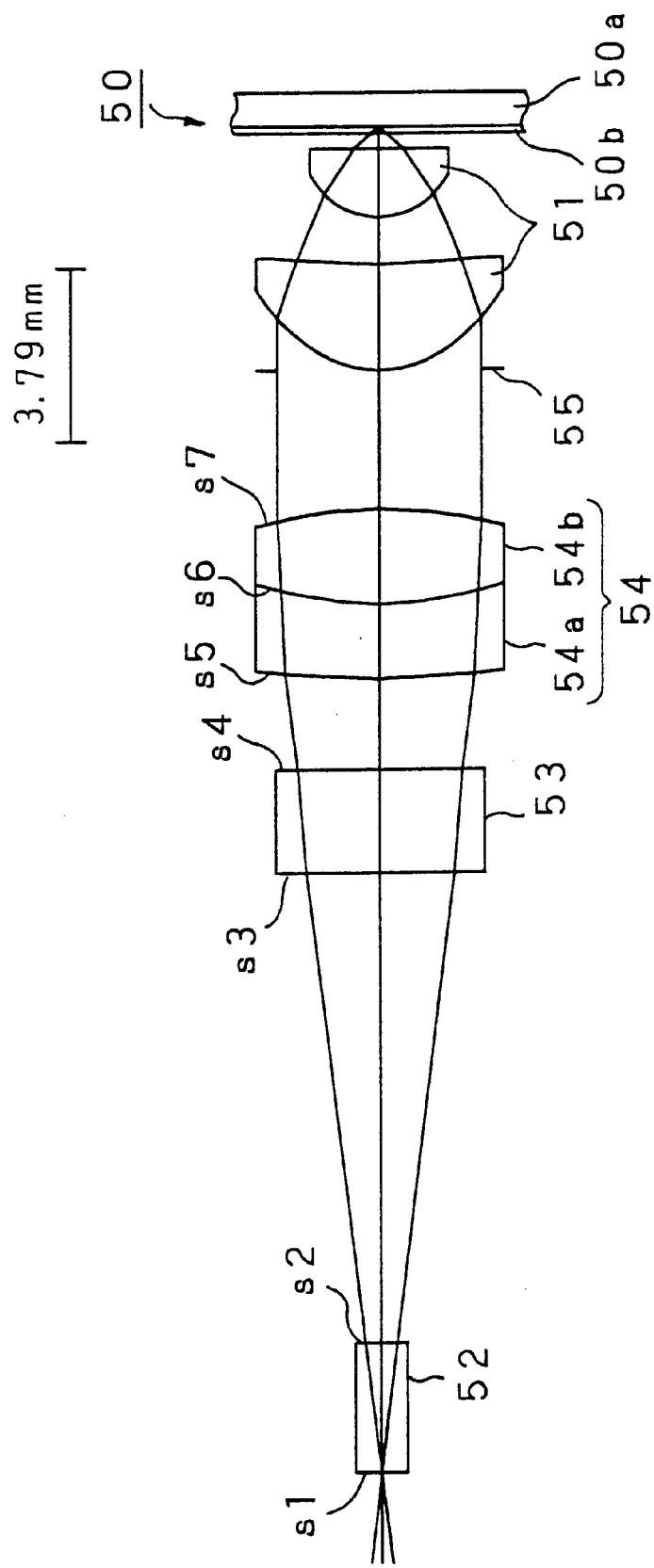
FIG. 14 shows schematics of an optical system of a first embodiment.

FIG. 14 shows an optical system of the present embodiment. Th optical system shown represents essential portions of the optical system of the optical head used in recording/reproducing an optical disc 50 having a recording layer formed on the surface of a substrate 50a and a light transmitting layer 50b formed on the recording layer. Between a light source and an objective lens 51 are arranged a diffraction lattice 52, a polarizing beam splitter 53, a collimator lens 54 and an aperture stop 55. The collimator lens 54 is a bonded spherical lens made up of a first lens 54a and a second lens 54b for achromatism. The lenses 54a, 54b are both spherical lenses. The numerical aperture NA of the light inlet side is set to 0.14.

Table 1 shows lens data for this optical system. The lens data, shown in Table 1, include an object surface OBJ, a light incident surface s1 and a light radiating surface s2 of the diffraction lattice 52, a light incident surface s3 and a light exit surface s4 of the polarizing beam splitter 53, a light incident surface s5 of the first lens 54a of the collimator lens 54, a bonding surface s6 of the first and second lenses 54a, 54b making up the collimator lens 54 and a light exit surface s7 of the second lens 54b of the collimator lens 54. In Table 1, s8 is a dummy surface and STO is an aperture stop 55 associated with the objective lens 51.

TABLE 1

| surface number | radius of curvature | upward separation from shaft | refractive index ηd | Abbe's number |
|---|---|---|---|---|
| OBJ | ∞ | 0.00000 | | |
| s1 | ∞ | 2.800000 | 1.51680 | 64.17 |
| s2 | ∞ | 10.130000 | | |
| s3 | ∞ | 2.200000 | 1.51680 | 64.17 |
| s4 | ∞ | 1.734906 | | |
| s5 | 22.03200 | 1.630000 | 1.78472 | 25.76 |
| s6 | 8.21300 | 2.100000 | 1.58267 | 46.47 |

TABLE 1-continued

| surface number | radius of curvature | upward separation from shaft | refractive index ηd | Abbe's number |
|---|---|---|---|---|
| s7 | −11.74000 | 3.265094 | | |
| s8 | ∞ | 0.000000 | | |
| STO | ∞ | 0.000000 | | |

It is assumed that the thickness of the light transmitting layer 50b of the optical disc 50 is 0.1 mm, the numerical aperture NA of the objective lens 51 is 0.85, and the wavelength of the light used λ is 635 nm. The multiplication factor between object and the image of the optical system is 0.1891.

Figure 15:
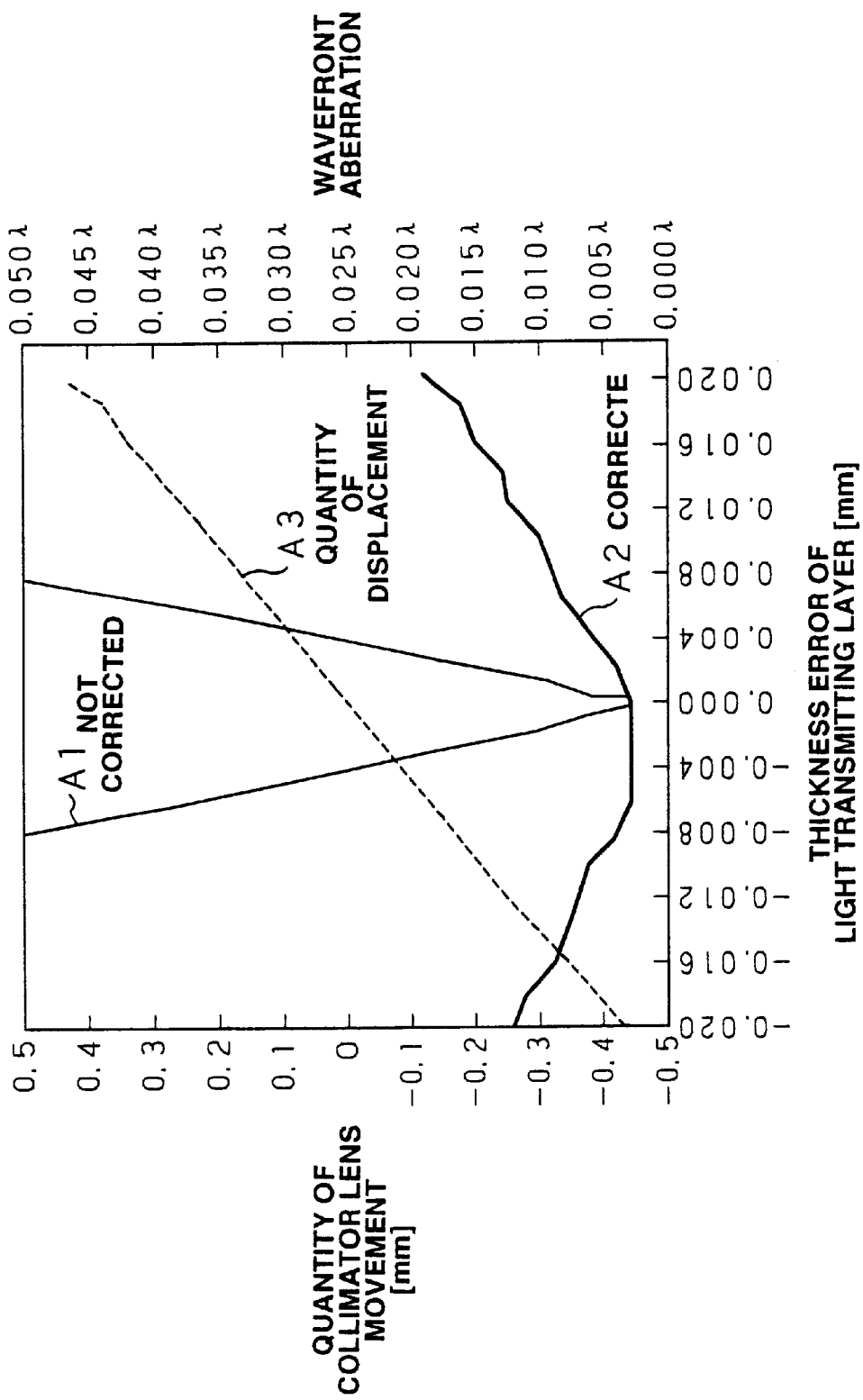
FIG. 15 shows the relation between the thickness error of the light transmitting layer, wavefront aberration and the amount of displacement of a collimator lens of the first embodiment.

FIG. 15 shows the relation between the thickness error of the light transmitting layer 50b and the wavefront aberration in the above optical system. Meanwhile, the standard deviation $WFB_{rms}$ on the exit pupil plane is indicated as the wavefront aberration in FIG. 15 with the wavelength of the light used being denoted as λ. Also, in FIG. 15, a broken line A1 and a solid line A2 indicate the relation between the thickness error of the light transmitting layer 50b and the wavefront aberration for the case in which the collimator lens 54 is not moved, that is in which the spherical aberration is not corrected, and for the case in which the collimator lens 54 is moved, that is in which the spherical aberration is corrected, depending on the thickness error of the light transmitting layer 50b as indicated by a broken line A3.

Referring to FIG. 15, if the light transmitting layer 50b is free of thickness errors, the wavefront aberration in this optical system is approximately 0.003 λ. As may be seen from FIG. 15, the wavefront aberration is increased excessively if the collimator lens 54 is not moved. However, by moving the collimator lens 54 depending on the thickness error of the light transmitting layer 50b, the wavefront aberration, produced by the thickness error of the light transmitting layer 50b, can be suppressed significantly.

Specifically, the wavefront aberration can be suppressed by moving the collimator lens 54, as shown by the following equation (12):

$$\Delta L \approx 21 \Delta t \quad (12)$$

even if the thickness of the light transmitting layer 50b is susceptible to variations, such that, if the thickness error of the light transmitting layer 50b is on the order of ±10 μm, the wavefront aberration can be suppressed to not larger than 0.01 λ.

In the above equation (12), ΔL is the amount of movement of the collimator lens 43, with the positive direction being the direction of movement of the collimator lens away from the optical disc 50, and Δt is the thickness error of the light transmitting layer 50b.

EXAMPLE 2

Figure 16:
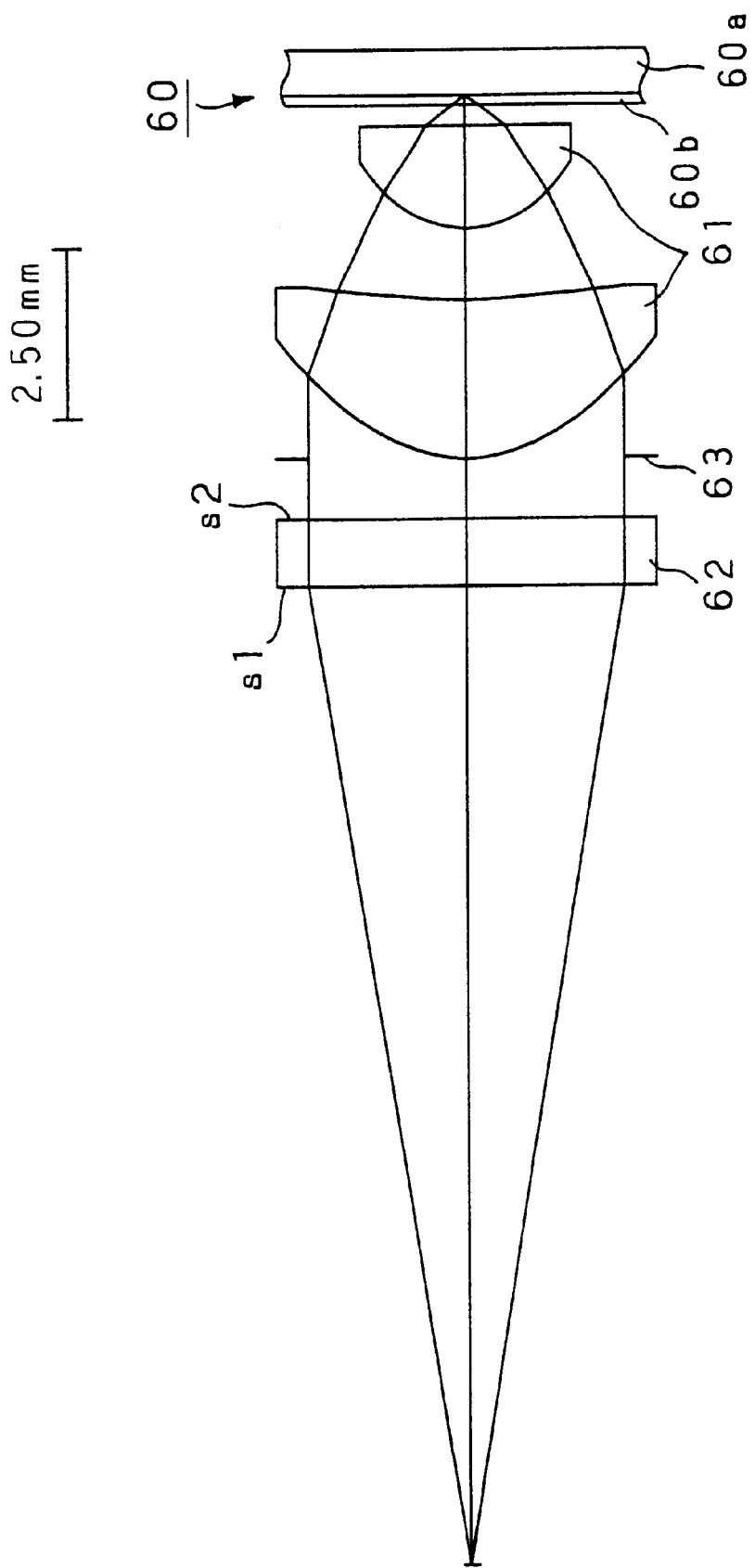
FIG. 16 shows schematics of an optical system of a second embodiment.

FIG. 16 shows an optical system of the present embodiment. The optical system shown represents essential portions of the optical system of the optical head used in recording/reproducing an optical disc 60 having a recording layer on the surface of a substrate 60a and a light transmitting layer 60b on the recording layer. Between the light source and the objective lens 61 are arranged a collimator lens 62 comprised of a hologram lens and an aperture stop 63.

Table 2 shows lens data for this optical system. The lens data, shown in Table 2, include an object surface OBJ, a light incident surface s1 and a light radiating surface s2 of the collimator lens 62, and a dummy surface s3. Also, STO is an aperture stop 63 associated with the objective lens 61.

TABLE 2

| surface number | radius of curvature or coefficient of phase difference function | upward separation from shaft | refractive index ηd | Abbe's number |
|---|---|---|---|---|
| OBJ | | 14.000000 | | |
| s1 | C1:−3.5714E-02<br>C2:4.5549E-05<br>C3:−1.1354E-07<br>C4:0.0 | 1.000000 | 1.515014 | 64.17 |
| s2 | ∞ | 0.860000 | | |
| s3 | ∞ | 0.000000 | | |
| STO | ∞ | 0.000000 | | | phase difference function: m = C1R$^2$ + C2R$^4$ + C3R$^6$ + C4R$^8$

It is assumed that the thickness of the light transmitting layer 60b of the optical disc 50 is 0.1 mm, the numerical aperture NA of the objective lens 61 is 0.85, and the wavelength of the light used λ is 635 nm. The multiplication factor between object and the image of the optical system is 0.1891.

Meanwhile, the collimator lens 62 is a so-called surface phase type hologram lens adapted for diffracting the incident light by according the phase difference thereto and has a numerical aperture NA on its light incident side equal to 0.16.

The collimator lens 62 has its lens surface machined to produce the phase difference in the incident light. That is, the collimator lens 62 has its lens surface machined to produce the phase difference in the transmitted light to thereby produce the light diffraction. In the optical system of the present embodiment, the first-order diffracted light, obtained on diffraction by this collimator lens 62, is adapted to fall on the objective lens 61.

The collimator lens 62 preferably has a blazed shape, that is a serrated shape. If the collimator lens 62 has the serrated shape, nearly 100% of the incident light becomes the first-order diffracted light, thus assuring a high light utilization efficiency.

The characteristics of the collimator lens 62 are represented by the phase difference function of the following equation (13):

$$m = C1R^2 + C2R^4 + C3R^6 + C4R^8 \quad (13)$$

where m denotes the optical path difference at a diffraction reference wavelength. The above equation (13) represents the phase deviation in each surface of the collimator lens 62 as the surface phase type hologram lens, expressed in terms of a polar coordinate polynominal on the substrate, when it is assumed that two point light sources are at an infinitely remote place at the time of manufacture of the collimator lens. The collimator lens 62 used in the present embodiment is a hologram lens in which the phase difference function is an axis-symmetrical hologram lens. In the above equation (13), R denotes the distance from the optical axis. In Table 2, C1, C2, C3 and C4 denote coefficients of the phase difference function when the diffraction reference wavelength in the collimator lens 62 is set to 635 nm.

Figure 17:
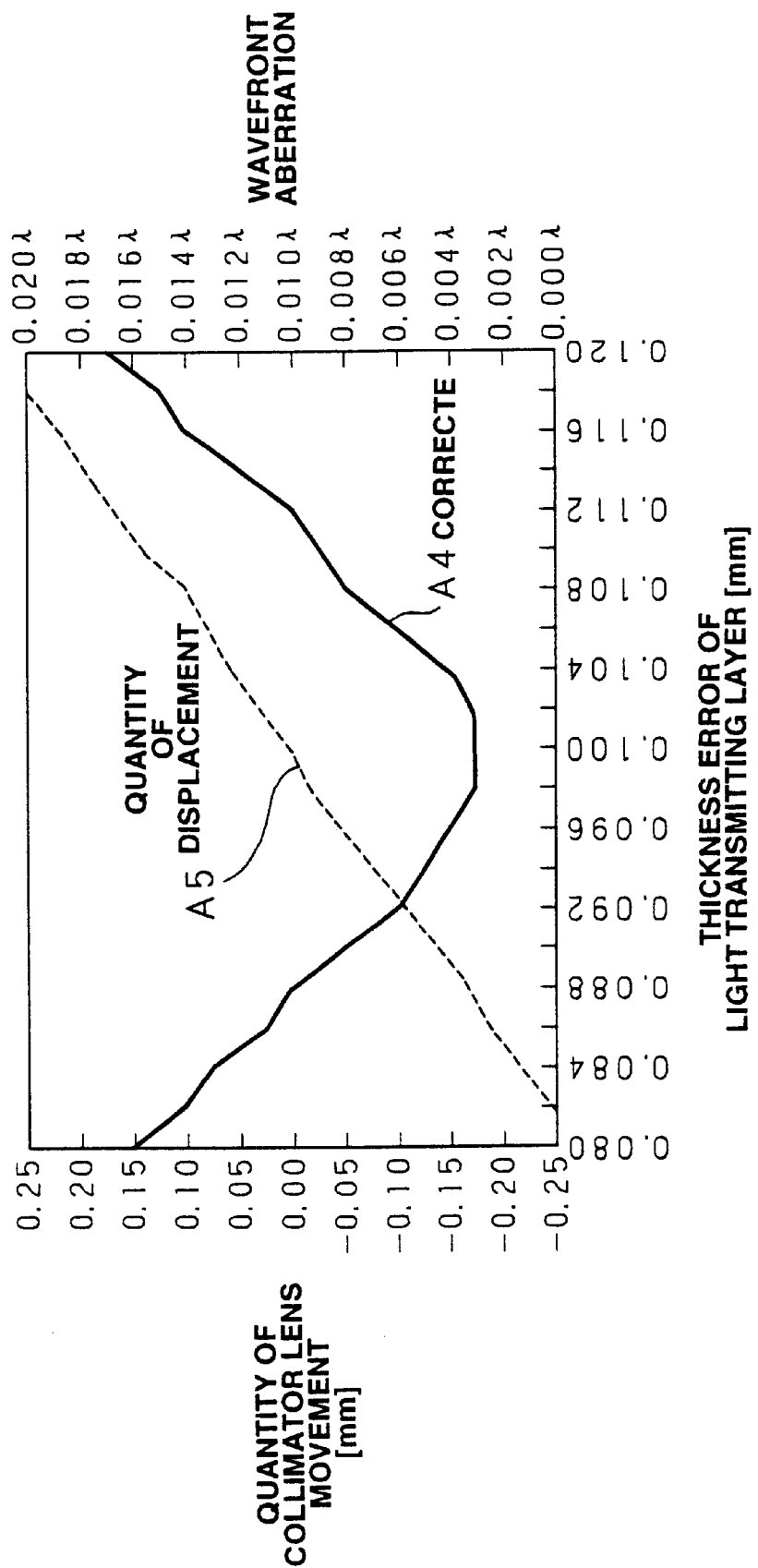
FIG. 17 shows the relation between the thickness error of the light transmitting layer, wavefront aberration and the amount of displacement of a collimator lens of the first embodiment.

The relation between the thickness error of the light transmitting layer 60b and the wavefront aberration in the above-described optical system is shown in FIG. 17, in which, similarly to FIG. 16, the standard deviation WFE$_{rms}$ on the exit pupil surface of the wavefront aberration is shown with the wavelength of the light used being denoted as λ. In FIG. 17, a solid line A4 denotes the relation between the thickness error of the light transmitting layer 60b and the wavefront aberration for a case in which the collimator lens 62 is moved responsive to the thickness error of the light transmitting layer 60b, as indicated by a broken line A5, that is for a case in which correction is made of the wavefront aberration.

Referring to FIG. 17, if there is no thickness error in the light transmitting layer 60b of the optical disc 60, the wavefront aberration in this optical system is approximately 0.003 λ. As may be seen from FIG. 17, the wavefront aberration produced due to the thickness error of the light transmitting layer 60b can be suppressed significantly by moving the collimator lens 62 responsive to the thickness error of the light transmitting layer 60b. Specifically, the wavefront aberration can be suppressed by causing the movement of the collimator lens 62, as shown by the following equation (14):

$$\Delta L \approx 14 \Delta t \quad (14)$$

despite variations in the thickness of the light transmitting layer 60b.

In the above equation (14), ΔL is the amount of displacement of the collimator lens 62, with the positive direction being the direction of movement of the collimator lens 62, and Δt is the thickness error of the light transmitting layer 60b.

Meanwhile, if the collimator lens is moved as in Examples 1 or 2, there is a risk of an offset being produced between the lenses or a tilt being produced in the lens surfaces. Such offset or tilt gives cause to coma aberration or astigmatic aberration. If the coma aberration or the astigmatic aberration is increased excessively, system failure results. The optical system of the Examples 1 or 2 is less susceptible to the effect of the offset between lenses or to tilt of lens surfaces because of the small numerical aperture NA on the light inlet side of the collimator lens. Specifically, the offset up to approximately 30 μm or lens surface tilt of the order of 0.1° in the optical system raises no problem for actual use since then the amount of the coma or astigmatic aberration is only small.

What is claimed is:

1. An optical head for an information recording medium having a light transmitting layer on a recording layer adapted for recording information signals, comprising:

a light source for radiating the light;

an objective lens for converging the light from said light source via said light transmitting layer on said recording layer;

an optical element of a pre-set refractive power arranged between said light source and the objective lens; and movement means for causing movement of said optical element responsive to the thickness of said light transmitting layer, said movement means including:

a reference shaft arranged substantially parallel to the optical axis of the light radiated from the light source to on the optical element;

optical element supporting means for supporting said optical element and adapted for being translated along said reference shaft;

a motor; and a gearing for converting the motor rotation into a translating movement parallel to said optical axis and for transmitting the translating movement to said optical element supporting means;

the motor rotation being converted by said gearing into the translating movement parallel to the optical axis to cause movement of said optical element supporting means to cause movement of said optical element so as to cancel the spherical aberration responsive to the thickness of said light transmitting layer.

2. The optical head according to claim 1 wherein said optical element is a collimator lens.

3. The optical head according to claim 1 wherein said light transmitting layer has a film thickness not larger than 0.47 mm and wherein said objective lens has a numerical aperture NA not smaller than 0.65.

4. The optical head according to claim 1 wherein said optical head further includes a biaxial actuator for causing movement of said objective lens in a direction along the optical axis and in a direction perpendicular thereto.

5. The optical head according to claim 4 wherein said biaxial actuator is a bobbin rotatable about a shaft parallel to the optical axis of the objective lens and which is slidable along said shaft, said biaxial actuator being adapted for supporting the objective lens.

6. The optical head according to claim 1 wherein a biaxial actuator causes movement of said optical element in the direction along the optical axis in a direction of cancelling the spherical aberration produced by thickness changes in the light transmitting layer.

7. The optical head according to claim 1 wherein the wavelength of the outgoing laser light is not larger than 650 nm.

8. A recording and/or reproducing apparatus for recording and/or reproducing information signals for a recording layer of an information recording medium also having a light transmitting layer on said recording medium, comprising:

thickness detection means for detecting the thickness of said light transmitting layer; and an optical head for an information recording medium having a light transmitting layer, on a recording layer adapted for recording information signals, comprising:

a light source for radiating the light an objective lens for converging the light from said light source via said light transmitting layer on said recording layer;

an optical element of a pre-set refractive power arranged between said light source and the objective lens; and movement means for causing movement of said optical element responsive to the thickness of said light transmitting layer as detected by said thickness detection means, said movement means including:

a reference shaft arranged substantially parallel to the optical axis of the light radiated from the light source to fall on the optical element; optical element supporting means for supporting said optical element and adapted for being translated along said reference shaft;

a motor; and a gearing for converting the motor rotation into a translating movement parallel to said optical axis and for transmitting the translating movement to said optical element supporting means;

the motor rotation being converted by said gearing into the translating movement parallel to the optical axis to cause movement of said optical element supporting means to cause movement of said optical element so as to cancel the spherical aberration responsive to the thickness of said light transmitting layer.

9. The recording and/or reproducing apparatus according to claim 8 wherein said optical element is a collimator lens.

10. The recording and/or reproducing apparatus according to claim 8 wherein said light transmitting layer has a film thickness not larger than 0.47 mm and wherein said objective lens has a numerical aperture NA not smaller than 0.65.

11. The recording and/or reproducing apparatus according to claim 8 wherein said optical head further includes a biaxial actuator for causing movement of said objective lens in a direction along the optical axis and in a direction perpendicular thereto.

12. The recording and/or reproducing apparatus according to claim 11 wherein said biaxial actuator is a bobbin rotatable about a shaft parallel to the optical axis of the objective lens and which is slidable along said shaft, said biaxial actuator being adapted for supporting the objective lens.

13. The recording and/or reproducing apparatus according to claim 8 wherein a biaxial actuator causes movement of said optical element in the direction along the optical axis in a direction of cancelling the spherical aberration produced by thickness changes in the light transmitting layer.

14. The recording and/or reproducing apparatus according to claim 8 wherein the wavelength of the outgoing laser light is not larger than 650 nm.

15. A recording and/or reproducing method for recording and/or reproducing information signals for a recording layer of an information recording medium also having a light transmitting layer, comprising:

using an optical head having a light source for radiating the light, an objective lens for converging the light from said light source via said light transmitting layer on said recording layer, and an optical element of a pre-set refractive power arranged between said light source and the objective lens; and detecting the thickness of said light transmitting layer to cause movement of said optical element responsive to the results of detection so as to cancel the spherical aberration.

16. The recording and/or reproducing method according to claim 15 wherein a collimator lens is used as said optical element.

17. The recording and/or reproducing method according to claim 15 wherein the light transmitting layer has a thickness not larger than 0.47 nm and wherein the numerical aperture NA of the objective lens is not less than 0.65.

18. A method for detecting the thickness of a light transmitting layer provided on a recording layer of an information recording medium, said recording layer being adapted for recording information signals thereon, comprising:

radiating light from a light source;

converging the light radiated by said light source by an objective lens on said information recording medium;

receiving the return light converged by said objective lens on said information recording medium and reflected from said information recording medium by a photodetector to detect focussing error signals, and detecting the thickness of said light transmitting layer from signal portions of said focussing error signals due to the return light reflected by said photodetector and those due to the return light reflected by the surface of said light transmitting layer.

* * * * *